US012155131B2

(12) United States Patent
Ryu et al.

(10) Patent No.: US 12,155,131 B2
(45) **Date of Patent: *Nov. 26, 2024**

(54) ELECTRONIC DEVICE HAVING ANTENNA

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR); Hyungjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 326 days.

This patent is subject to a terminal disclaimer.

(21) Appl. No.: 17/641,075

(22) PCT Filed: Sep. 5, 2019

(86) PCT No.: PCT/KR2019/011469

§ 371 (c)(1),
(2) Date: Mar. 7, 2022

(87) PCT Pub. No.: WO2021/045268

PCT Pub. Date: Mar. 11, 2021

(65) Prior Publication Data

US 2022/0336946 A1 Oct. 20, 2022

(51) Int. Cl.
*H01Q 5/55* (2015.01)
*H01Q 1/32* (2006.01)

(52) U.S. Cl.
CPC ............. *H01Q 5/55* (2015.01); *H01Q 1/3275* (2013.01)

(58) Field of Classification Search
CPC .. H01Q 5/20; H01Q 5/25; H01Q 5/55; H01Q 1/3275
See application file for complete search history.

(56) References Cited

U.S. PATENT DOCUMENTS

2015/0244077 A1* 8/2015 Sanford ............... H01Q 21/064 343/776
2015/0357720 A1 12/2015 Chen et al.
(Continued)

FOREIGN PATENT DOCUMENTS

| | | |
|---|---|---|
| JP | H08139515 | 5/1996 |
| JP | 2009212717 | 9/2009 |
| KR | 20050071365 | 7/2005 |

OTHER PUBLICATIONS

PCT International Application No. PCT/KR2019/011469, International Search Report dated Jun. 5, 2020, 6 pages.

*Primary Examiner* — Daniel Munoz
(74) *Attorney, Agent, or Firm* — LEE, HONG, DEGERMAN, KANG & WAIMEY

(57) ABSTRACT

Provided is an electronic device having an antenna according to the present invention. The electronic device comprises a cone antenna comprising: a cone radiator which is provided between a first substrate and a second substrate, has the upper part connected to the first substrate and the lower part connected to the second substrate, and has an opening on the upper part; a metal patch which is formed on the first substrate and is positioned away from the upper opening; a shorting pin which is for electrically connecting the metal patch and a ground layer of the second substrate; a power feeding unit which is formed on the second substrate and is for transmitting a signal via a lower opening; and a dielectric which is formed in a cylindrical shape so as to surround the lower opening.

17 Claims, 21 Drawing Sheets

(56) References Cited

U.S. PATENT DOCUMENTS

| | | | | |
|---|---|---|---|---|
| 2016/0372823 | A1* | 12/2016 | Yoon | H01Q 1/48 |
| 2018/0358697 | A1 | 12/2018 | Zhou et al. | |

* cited by examiner

ELECTRONIC DEVICE HAVING ANTENNA

CROSS-REFERENCE TO RELATED APPLICATIONS

This application is the National Stage filing under 35 U.S.C. 371 of International Application No. PCT/KR2019/011469, filed on Sep. 5, 2019, the contents of which are all incorporated by reference herein in its entirety.

TECHNICAL FIELD

The present disclosure relates to an electronic device having a wide-band antenna. More particularly, the present disclosure relates to an electronic device having a cone antenna operating from a low frequency band to a frequency band of 5 GHz.

BACKGROUND

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Accordingly, a broadband antenna operating in both the LTE frequency band and the 5G Sub-6 frequency band needs to be disposed in the electronic device. However, the broadband antenna such as the cone antenna has problems in that an overall antenna size thereof increases and a weight thereof increases.

Furthermore, the broadband antenna such as the cone antenna may be implemented in a three-dimensional structure compared to a planar antenna in the related art. Accordingly, there is a problem in that there is no specific arrangement structure for arranging the cone antenna having such a three-dimensional structure in an electronic device or vehicle.

In addition, in a multi-layered substrate structure on which the cone antenna is disposed, a metal may be removed from a ground plane of the substrate when the power feeder is disposed. In this regard, as the metal is removed from the ground plane, there is a problem in that it is difficult to arrange a signal line in a region of the relevant substrate.

SUMMARY

An aspect of the present disclosure is to solve the above-mentioned problems and other problems. Furthermore, another aspect of the present disclosure is to provide an electronic device having a broadband antenna element operating from a low frequency band to a 5 GHz band.

Still another aspect of the present disclosure is to provide a power feeding structure having an optimal structure so as to prevent a metal from being removed even from a ground region of a substrate on which a power feeder that feeds power to a broadband antenna is disposed.

In order to achieve the foregoing or other objectives, an electronic device having an antenna according to the present disclosure is provided. The electronic device may include a cone radiator provided between the first substrate and the second substrate, an upper part of which is connected to the first substrate, a lower part of which is connected to the second substrate, and provided with an aperture at the upper part; a metal patch disposed on the first substrate, and spaced apart from the upper aperture; a shorting pin disposed to electrically connect the metal patch and the ground layer of the second substrate; a power feeder disposed on the second substrate, and configured to transmit a signal through a lower aperture; and a dielectric configured in a cylindrical shape to surround the lower aperture, thereby providing an optimal structure of the power feeder while providing the cone antenna operating in a wide frequency band up to 5G sub-6 band.

According to an embodiment, the electronic device may further include a transceiver circuit connected to the cone radiator through the power feeder to control a signal to be radiated through the cone antenna.

According to an embodiment, an end portion of the power feeder may be defined in a ring shape to correspond to a shape of the lower aperture.

According to an embodiment, the dielectric may be defined in a three-dimensional sector form from which the dielectric is partially removed in a predetermined angular range in a region where a transmission line of the power feeder is disposed.

According to an embodiment, the dielectric in the three-dimensional sector shape may be disposed above an end portion of the power feeder in the ring shape to reduce a ring diameter of the end portion of the power feeder and a diameter of the lower aperture.

According to an embodiment, an end portion of the power feeder and a lower region of a transmission line region connected to the end portion may be filled without removing the ground layer of the second substrate. Accordingly, there is an advantage in that signal lines can be arranged around the power feeder while maintaining the performance of the cone antenna operating from a low frequency band to a 5G sub-6 band in the electronic device or vehicle.

According to an embodiment, the shorting pin may be defined as a single shorting pin vertically connected between the metal patch and the second substrate, and a null of a radiation pattern of the cone antenna may be prevented from being generated by the single shorting pin.

According to an embodiment, the shorting pin may be provided with a screw having a predetermined diameter configured to vertically connect between the metal patch and the second substrate, and the shorting pin may further include a second dielectric disposed to surround the screw corresponding to the shorting pin, and configured in a cylindrical shape having a predetermined diameter.

According to an embodiment, the electronic device may further include at least one non-metal supporter configured to vertically connect the first substrate and the second substrate so as to support the first substrate and the second substrate.

According to an embodiment, a signal line may be disposed on a rear surface of the third substrate corresponding to the filled ground layer of the second substrate, and signal loss may be reduced by the filled ground layer corresponding to the signal line.

According to an embodiment, the cone antenna may include a plurality of outer rims configured to constitute the upper aperture of the cone antenna and to connect the cone antenna to the first substrate; and a plurality of fasteners configured to connect the outer rims and the first substrate.

According to an embodiment, the electronic device may further include a fastener configured to be connected to the second substrate through an inside of the end portion of the power feeder, wherein the second substrate on which the power feeder is disposed and the cone radiator are fixed through the fastener.

According to an embodiment, the metal patch may be disposed only on one side so as to surround a partial region of an upper opening of the cone antenna to minimize a size of the cone antenna including the metal patch.

According to an embodiment, the metal patch may be disposed as a rectangular patch having an outer side shape in a rectangular form, and an inner side shape of the rectangular patch may be defined in a circular shape to correspond to a shape of an outer line of the upper aperture so as to allow a signal radiated from the cone antenna to be coupled through an inner side of the rectangular patch.

According to an embodiment, the metal patch may be disposed as a circular patch having an outer side shape in a circular form, and an inner side shape of the circular patch may be defined in a circular shape to correspond to an outer shape of the upper aperture so as to allow a signal radiated from the cone antenna to be coupled through an inner side of the circular patch.

A vehicle according to another aspect of the present disclosure may include a cone radiator provided between a first substrate and a second substrate, an upper part of which is connected to the first substrate, a lower part of which is connected to the second substrate, and provided with an aperture at the upper part; a metal patch disposed on the first substrate, and spaced apart from the upper aperture; a shorting pin disposed to electrically connect the metal patch and the ground layer of the second substrate; a power feeder disposed on the second substrate, and configured to transmit a signal through a lower aperture; and a dielectric configured in a cylindrical shape to surround the lower aperture.

According to an embodiment, the cone antenna may be implemented with a plurality of cone antennas disposed in the electronic device, and may include a transceiver circuit connected to the cone radiator through the power feeder to control a signal to be radiated through the cone antenna; and a processor that controls an operation of the transceiver circuit. In this case, the processor may control the transceiver to perform multi-input multi-output (MIMO) through the plurality of cone antennas.

According to an embodiment, an end portion of the power feeder may be defined in a ring shape to correspond to a shape of the lower aperture, and the dielectric may be defined in a three-dimensional sector form from which the dielectric is partially removed in a predetermined angular range in a region where a transmission line of the power feeder is disposed.

According to an embodiment, the dielectric in the three-dimensional sector shape may be disposed above an end portion of the power feeder in the ring shape to reduce a ring diameter of the end portion of the power feeder and a diameter of the lower aperture.

According to an embodiment, an end portion of the power feeder and a lower region of a transmission line region connected to the end portion may be filled without removing the ground layer of the second substrate.

According to the present disclosure, there is an advantage capable of providing an optimal structure of a power feeder as well as providing a cone antenna operating in a wide frequency band from a low frequency band to a 5G sub-6 band.

Furthermore, according to the present disclosure, there is an advantage in that signal lines can be arranged around the power feeder while maintaining the performance of the cone antenna operating from a low frequency band to a 5G sub-6 band in the electronic device or vehicle.

In addition, according to the present disclosure, there is an advantage capable of providing a cone antenna in which a dielectric having a three-dimensional shape capable of filling the ground with a metal is disposed around a power feeder so as to allow a signal line to be disposed around the power feeder of the cone antenna.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

DETAILED DESCRIPTION

Figure 1A:
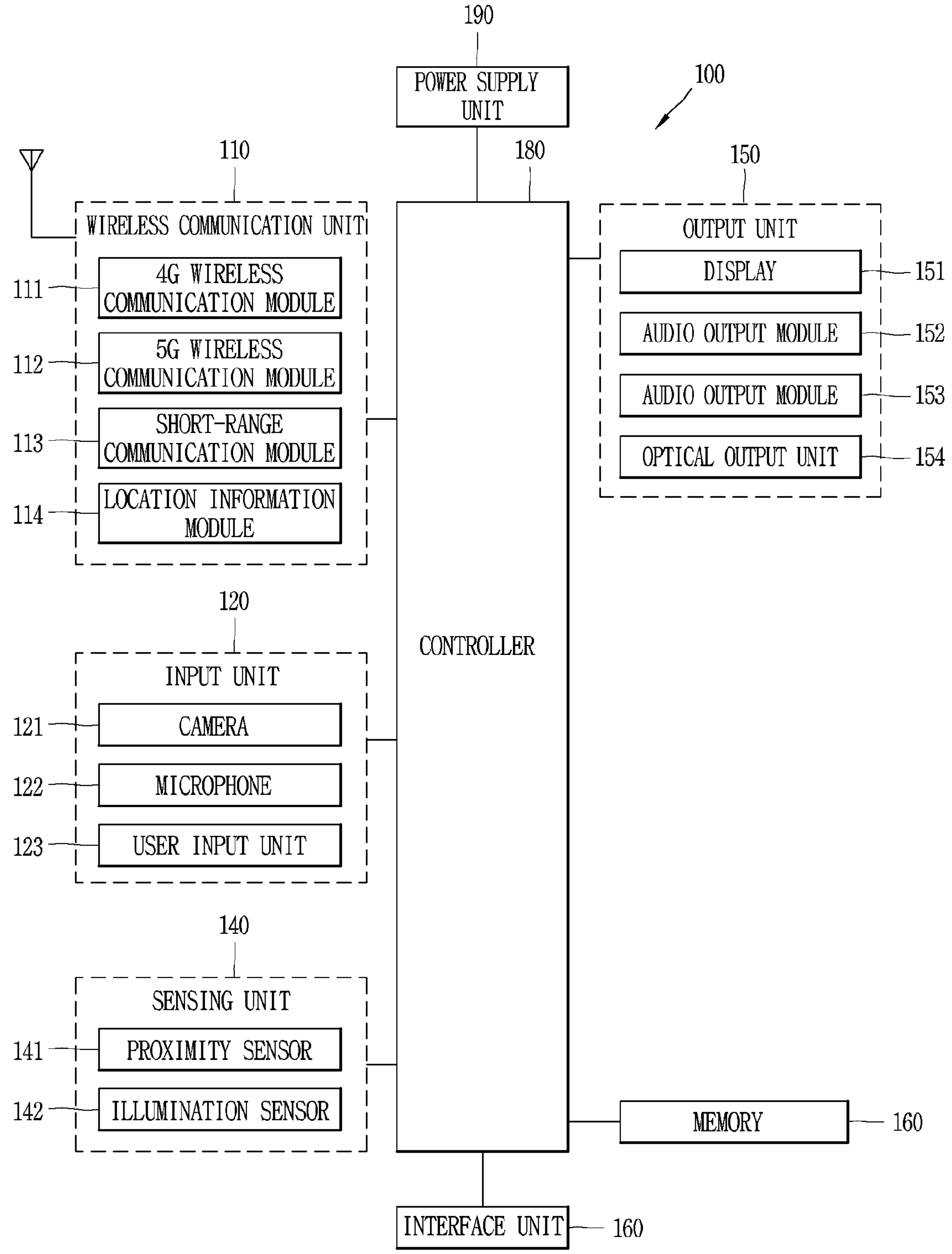
FIG. 1A is a block diagram of an electronic device in accordance with one exemplary implementation of the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the main point of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
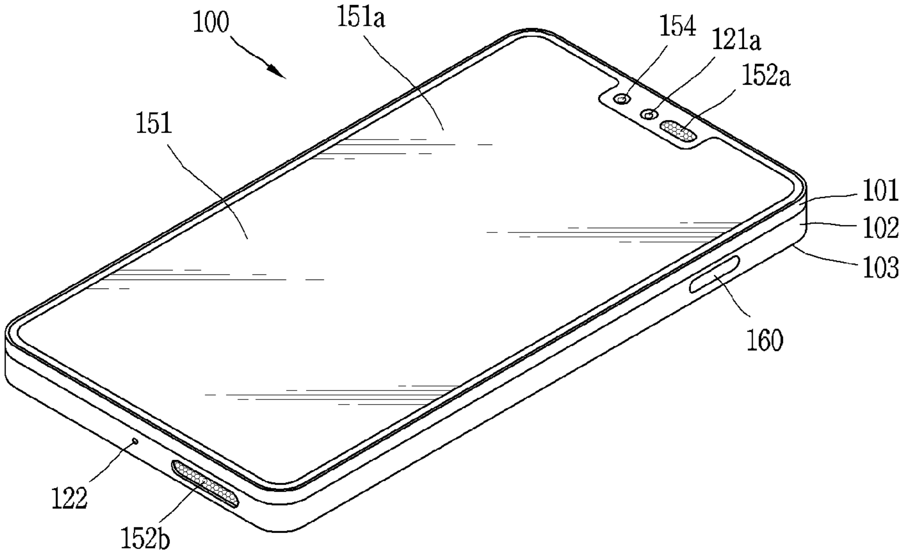
FIGS. 1B and 1C are conceptual views illustrating one example of an electronic device, viewed from different directions.
Figure 1C:
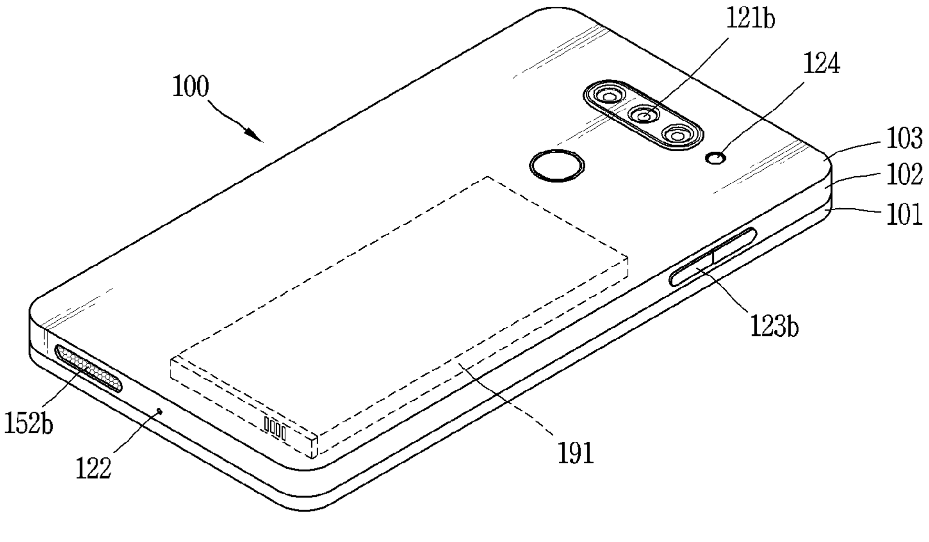

Referring to FIGS. 1A to 10, FIG. 1A is a block diagram of an electronic device in accordance with one exemplary implementation of the present disclosure, and FIGS. 1B and 10 are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be a 4G communication network and a 5G communication network, for example.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 10, the disclosed electronic device 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display 151 may be mounted to the front case 101 so as to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may output light for indicating an event generation. Examples of the event may include a message reception, a call signal reception, a missed call, an alarm, a schedule notice, an email reception, information reception through an application, and the like. When a user has checked a generated event, the controller 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device or vehicle having the same according to the present disclosure, with reference to the accompanying drawings. It will be apparent to those skilled in the art that the present disclosure may be embodied in other specific forms without departing from the spirit or essential characteristics thereof.

Figure 2:
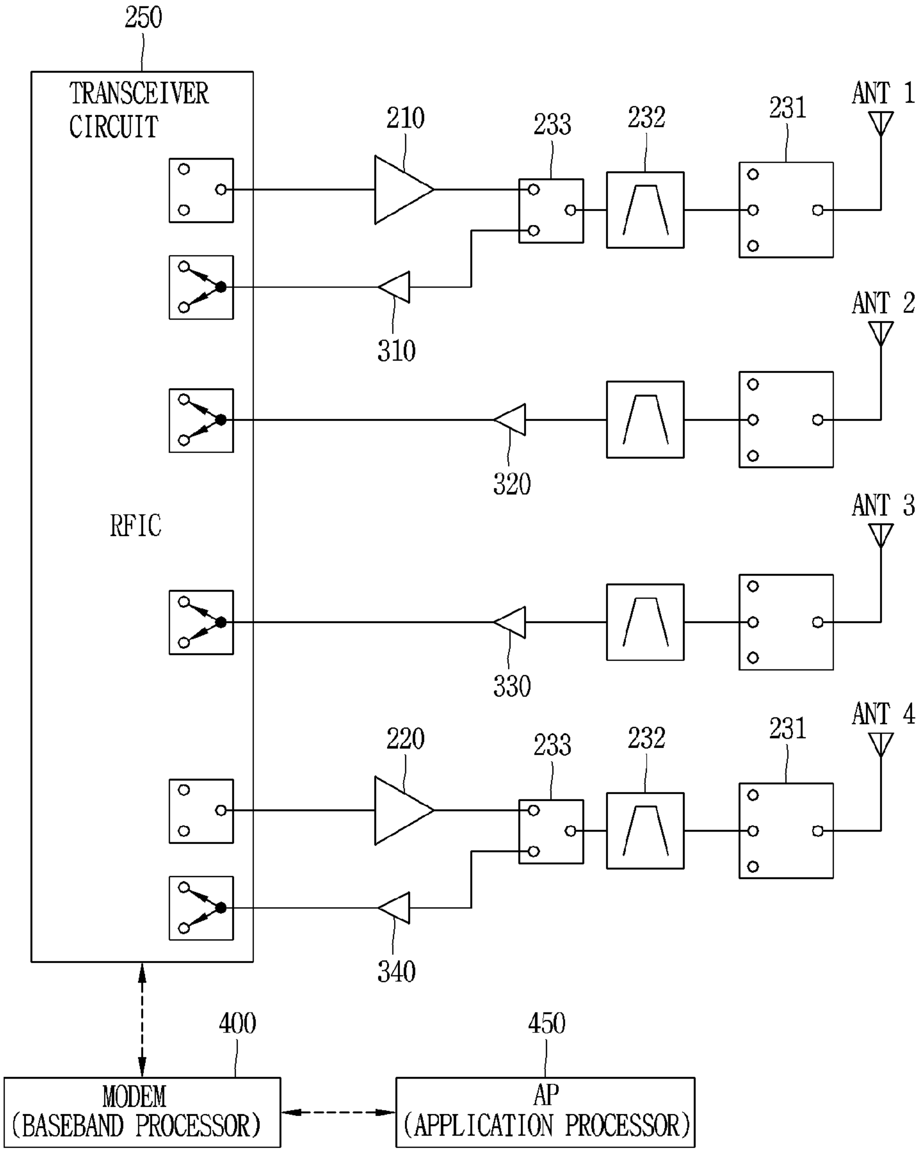
FIG. 2 is a block diagram illustrating a configuration of a wireless communication unit of an electronic device or a vehicle operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 450. Here, the modem 400 and the application processor (AP) 450 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 310 to 340 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure is not limited thereto. The RFIC 250 may be configured as a 4G/5G separated type according to an application. When the RFIC 250 is configured as the 4G/5G integrated type, it has advantages in terms of synchronization between 4G and 5G circuits and simplification of control signaling by the modem 400.

On the other hand, when the RFIC 250 is configured as the 4G/5G separated type, the separated RFIDs may be referred to as 4G RFIC and 5G RFIC, respectively. In particular, when there is a great difference between a 5G band and a 4G band, such as a case where the 5G band is configured as a mmWave band, the RFIC 250 may be configured as the 4G/5G separated type. As such, when the RFIC 250 is configured as the 4G/5G separated type, RF characteristics can be optimized for each of a 4G frequency band and a 5G frequency band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 450 is configured to control the operation of each component of the electronic device. Specifically, the application processor (AP) 450 may control the operation of each component of the electronic device through the modem 400.

For example, the modem 400 may be controlled through a power management IC (PMIC) for low power operation of the electronic device. Accordingly, the modem 400 may control power circuits of a transmitter and a receiver to operate in a low power mode through the RFIC 250.

In this regard, when it is determined that the electronic device is in an idle mode, the application processor (AP) 450 may control the RFIC 250 through the modem 400 as follows. For example, when the electronic device is in an idle mode, the application processor 280 may control the RFIC 250 through the modem 400, such that at least one of the first and second power amplifiers 110 and 120 operates in the low power mode or is turned off.

According to another implementation, the application processor (AP) 450 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 450 may control the modem 400 to enable wireless communication at the lowest power. Accordingly, the application processor (AP) 450 may control the modem 400 and the RFIC 250 to perform short-range communication using only the short-range communication module 113, even at the expense of throughput.

According to another implementation, when the remaining battery level of the electronic device is above the threshold, the modem 400 may be controlled to select an optimal wireless interface. For example, the application processor (AP) 450 may control the modem 400 to receive data through both the 4G base station and the 5G base station according to the remaining battery level and the available radio resource information. In this case, the application processor (AP) 450 may receive the remaining battery information from the PMIC, and the available radio resource information from the modem 400. Accordingly, when the remaining battery level and the available radio resources are sufficient, the application processor (AP) 450 may control the modem 400 and the RFIC 250 to receive data through both the 4G base station and 5G base station.

Meanwhile, a multi-transceiving system of FIG. 2 may integrate a transmitter and a receiver of each radio system into one transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the other hand, the multi-transceiving system as illustrated in FIG. 2 has advantages of controlling different communication systems according to necessity and minimizing system delay, which may result in enabling efficient resource allocation.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 250. Accordingly, a separate external component is not needed, thereby improving a component mounting configuration. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a duplexer 231, a filter 232, and a switch 233.

The duplexer 231 is configured to isolate signals of a transmission band and a reception band from each other. In this case, signals in a transmission band transmitted through the first and second power amplifiers 210, 220 are applied to the antennas (ANT1, ANT4) through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to a second output port of the duplexer 231. Alternatively, the filter 232 may be configured to pass only signals in the transmission band or only signals in the reception band according to a control signal.

The switch 233 is configured to transmit only one of the transmission signal or the reception signal. In one implementation of the present disclosure, the switch 233 may be configured as a single pole double throw (SPDT) type switch to isolate a transmission signal and a reception signal from each other using a time division duplex (TDD) scheme. Here, the transmission signal and the reception signal are signals of the same frequency band, and thus the duplexer 231 may be implemented in the form of a circulator.

Meanwhile, in another implementation of the present disclosure, the switch 233 may also be applied to a frequency division multiplex (FDD) scheme. In this case, the switch 233 may be configured as a double pole double throw (DPDT) type switch to connect or block a transmission signal and a reception signal. On the other hand, since the transmission signal and the reception signal can be isolated by the duplexer 231, the switch 233 is not always necessary.

Meanwhile, the electronic device according to an implementation may further include a modem 400 corresponding to the controller. In this case, the RFIC 250 and the modem 400 may be referred to as a first controller (or a first processor) and a second controller (a second processor), respectively. Meanwhile, the RFIC 250 and the modem 400 may be implemented as physically isolated circuits. Alternatively, the RFIC 250 and the modem 400 may be logically or functionally distinguished from each other on one physical circuit.

The modem 400 may perform control of signal transmission and reception through different communication systems using the RFID 250 and processing of those signals. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at a specific time and frequency resources. Accordingly, the RFIC 250 may control transmission circuits including the first and second power amplifiers 210 and 220 to transmit a 4G signal or a 5G signal at a specific time interval. In addition, the RFIC 250 may control reception circuits including the first to fourth low noise amplifiers 310 to 340 to receive a 4G signal or a 5G signal at a specific time interval.

On the other hand, a detailed operation and function of an electronic device having an array antenna operating in different bands according to the present disclosure provided with a multi-transceiving system as shown in FIG. 2 will be described below.

In a 5G communication system according to the present disclosure, a 5G frequency band may include a Sub-6 band and/or an LTE frequency band higher than the LTE frequency band. As such, a broadband antenna capable of supporting both the 4G communication system and the 5G communication system needs to be provided in the electronic device. In this regard, the present disclosure provides a broadband antenna (e.g., cone antenna) capable of operating from a low frequency band to about 5 GHz band.

Figure 3:
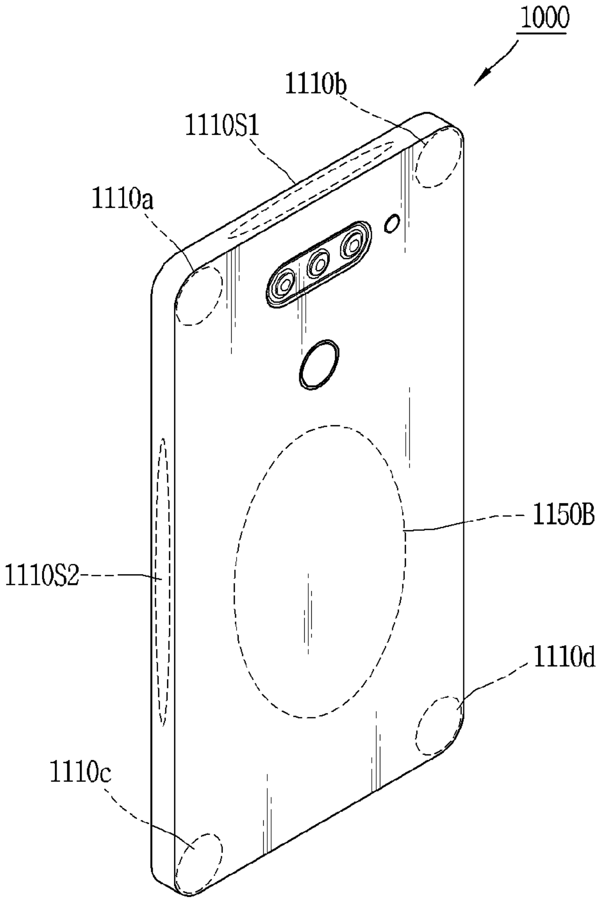
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110*a* to 1110*d* or 1150B may be arranged on a rear surface of the electronic device 100. Alternatively, a plurality of antennas 1110S1 and 1110S2 may be disposed on a side surface of the electronic device 100. Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. In addition, a cone antenna according to the present disclosure may be mounted on a vehicle other than an electronic device to provide a 4G communication service and a 5G communication service.

On the other hand, referring to FIG. 2, a plurality of antennas (e.g., cone antennas) ANT 1 to ANT 4 may be arranged on a side surface or a rear surface of the electronic device 100.

Meanwhile, referring to FIGS. 2 and 3, at least one signal may be transmitted or received through the plurality of antennas 1110*a* to 1110*d* corresponding to the plurality of antennas ANT 1 to ANT 4. In this regard, each of the plurality of antennas 1110*a* to 1110*d* may be configured as a single cone antenna. The electronic device may communicate with a base station through any one of the plurality of cone antennas 1110*a* to 1110*d*. Alternatively, the electronic device may perform multi-input multi-output (MIMO) communication with the base station through two or more antennas among the plurality of cone antennas 1110*a* to 1110*d*.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of cone antennas 1110S1 to 1110S4 on a side surface of the electronic device 100. On the other hand, the electronic device may communicate with the base station through any one of the plurality of cone antennas 1110S1 to 1110S4. Alternatively, the electronic device may perform multi-input multi-output (MIMO) communication with the base station through two or more antennas among the plurality of cone antennas 1110S1 to 1110S4.

On the other hand, in the present disclosure, at least one signal may be transmitted or received through the plurality of cone antennas 1110*a* to 1110*d*, 1150B, and 1110S1 to 1110S4 on a rear surface and/or a side surface of the electronic device 100. Meanwhile, the electronic device may communicate with the base station through any one of the plurality of antennas 1110*a* to 1110*d*, 1150B, and 1110S1 to 1110S4. Alternatively, the electronic device may perform multi-input multi-output (MIMO) communication with the base station through two or more antennas among the plurality of antennas 1110*a* to 1110*d*, 1150B, and 1110S1 to 1110S4.

Hereinafter, an electronic device having a cone antenna according to the present disclosure will be described.

Figure 4A:
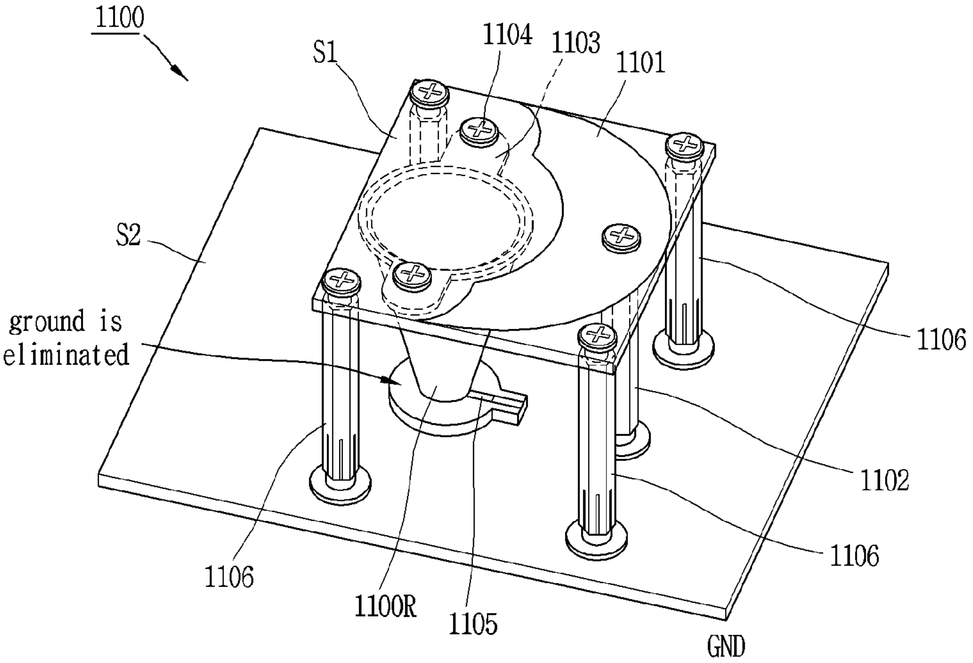
FIG. 4A is a perspective view showing a three-dimensional structure of a cone antenna and a power feeder from which a ground region around the power feeder is removed in connection with the present disclosure.
Figure 4B:
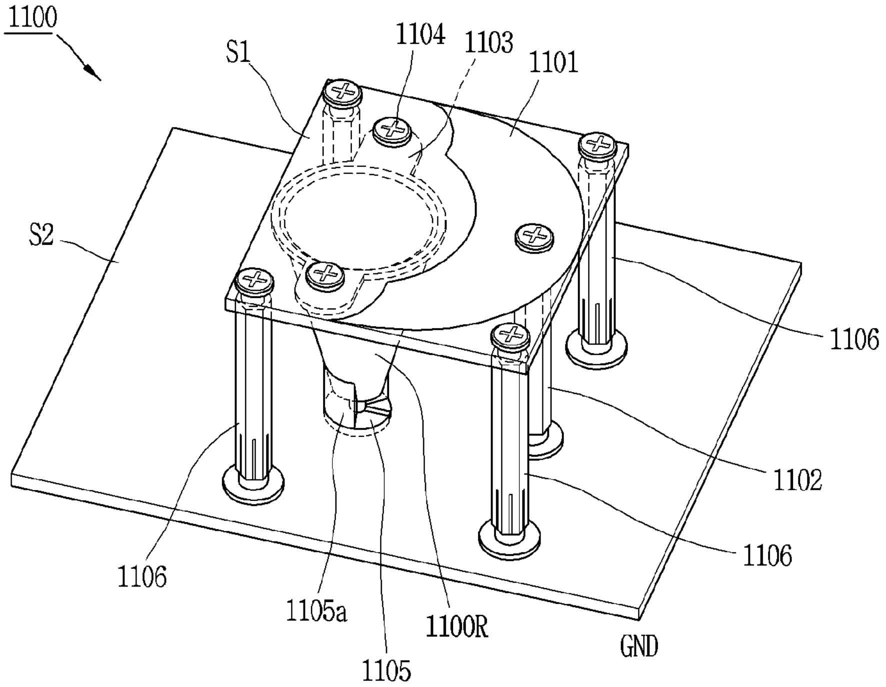
FIG. 4B is a perspective view showing a three-dimensional structure of a cone antenna and a power feeder according to the present disclosure.
Figure 4C:
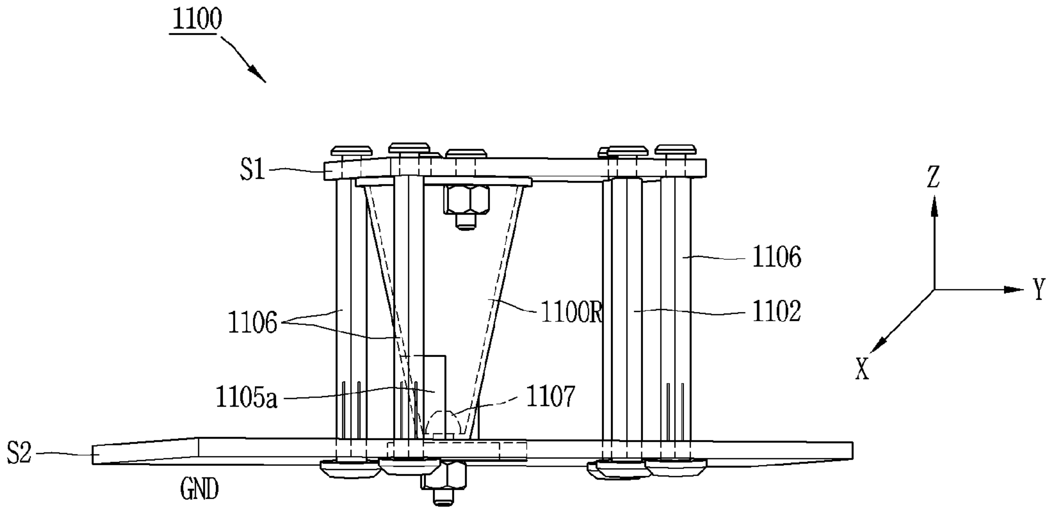
FIG. 4C is a side view showing a three-dimensional structure of the cone antenna and the power feeder according to the present disclosure.

In this regard, FIGS. 4A and 4C show a detailed structure of a power feeder in a broadband antenna (e.g., a cone antenna) capable of operating from a low frequency band to about 5 GHz band according to the present disclosure. Specifically, FIG. 4A is a perspective view showing a three-dimensional structure of a cone antenna and a power feeder from which a ground region around the power feeder is removed in connection with the present disclosure. Specifically, FIG. 4B shows a perspective view of a three-dimensional structure of a cone antenna and a power feeder according to the present disclosure. On the other hand, FIG. 4C is a side view showing a three-dimensional structure of the cone antenna and the power feeder according to the present disclosure.

Referring to FIGS. 4A to 4C, an electronic device having an antenna according to the present disclosure includes a cone antenna 1100. Here, the cone antenna 1100 may include a metal patch 1101, a cone radiator 1100R, a shorting pin 1102, and a power feeder 1105.

Meanwhile, in FIG. 4A, a ground layer GND corresponding to the power feeder 1105 is removed from a rear surface of a second substrate S2 on which the power feeder 1105 that feeds power to the cone radiator 1100R is disposed. Accordingly, there is a problem in that ground characteristics for a signal line on the second substrate S2 or another substrate coupled to the second substrate S2 may be reduced as the ground layer GND corresponding to the power feeder 1105 is removed.

Figure 5A:
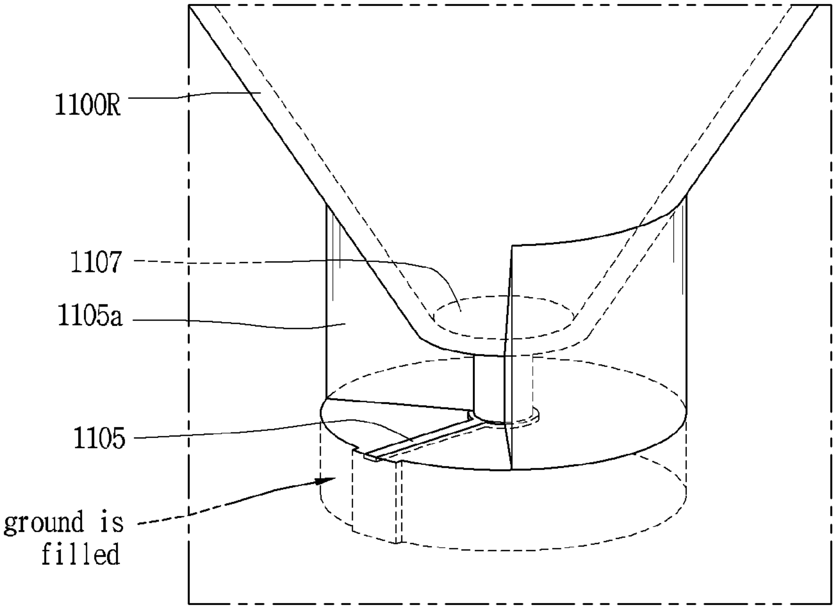
FIG. 5A is an enlarged perspective view of a lower part of a cone antenna, a dielectric, and a power feeder disposed with the dielectric.
Figure 5B:
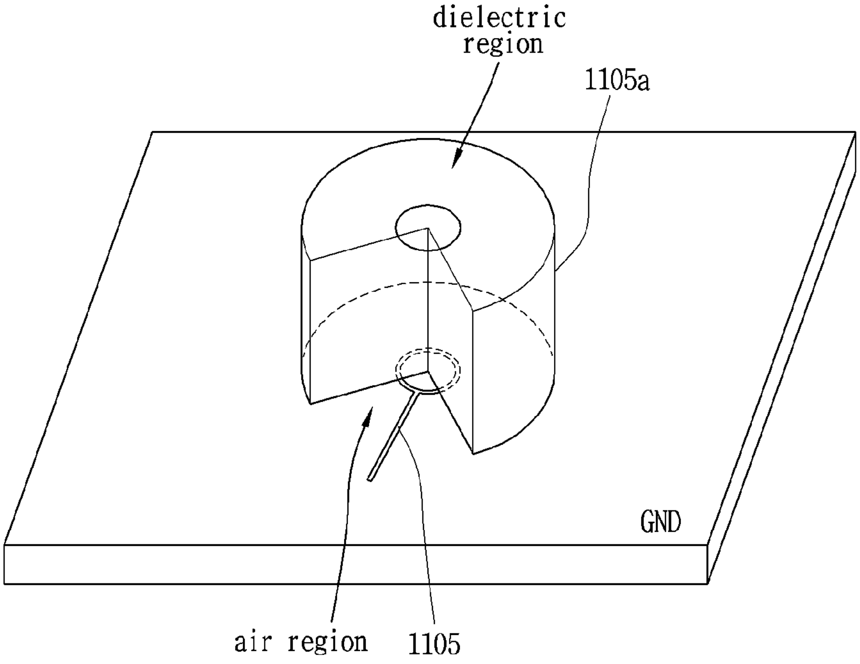
FIG. 5B is an enlarged perspective view of the dielectric and the power feeder disposed with the dielectric according to the present disclosure.
Figure 6:
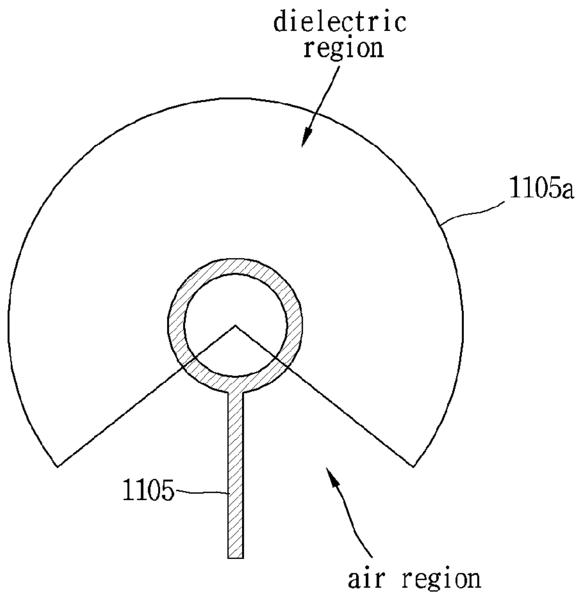
FIG. 6 is an enlarged plan view of a lower part of a cone antenna and a power feeder disposed with a dielectric according to the present disclosure.

In order to solve the foregoing problem, in the present disclosure, a dielectric 1105*a* is disposed on the power feeder 1105 to surround a lower aperture of the cone radiator 1100R as shown in FIG. 4B. In this regard, FIG. 5A is an enlarged perspective view of a lower part of a cone antenna, a dielectric, and a power feeder disposed with the dielectric. On the other hand, FIG. 5B is an enlarged perspective view of the dielectric and the power feeder disposed with the dielectric according to the present disclosure. Furthermore, FIG. 6 is an enlarged plan view of a lower part of a cone antenna and a power feeder disposed with a dielectric according to the present disclosure.

Referring to FIGS. 4B to 6, the cone antenna 1100 may include a first substrate S1 corresponding to an upper substrate, a second substrate S2 corresponding to a lower substrate, and a cone radiator 1100R. Furthermore, the cone antenna 1100 may further include a metal patch 1101, the shorting pin 1102, and the power feeder 1105.

In addition, the cone antenna 1100 may further include an outer rim 1103 and fasteners 1104 for allowing the cone antenna 1100 to be fixed to the first substrate S1 through the outer rim 1103. Furthermore, the cone antenna 1100 may further include a fastener 1107 that fastens non-metal supporters 1106 to the power feeder 1105. Here, the fasteners 1104 and 1107 may be implemented as fasteners such as screws having a predetermined diameter.

In this regard, the second substrate S2 may be spaced apart from the first substrate S1 by a predetermined gap, and may be provided with a ground layer GND. Meanwhile, the cone radiator 1100R may be disposed to be provided between the first substrate S1 and the second substrate S2. Specifically, the cone radiator 1100R may be vertically connected between the first substrate S1 and the second substrate S2 to connect the first substrate S1 and the second substrate S2. In addition, an upper part of the cone radiator 1100R is connected to the first substrate S1, and a lower part thereof is connected to the second substrate S2, and the cone radiator may include an upper aperture on the upper part.

Meanwhile, the metal patch 1101 may be disposed on the first substrate S1 to be spaced apart from the upper aperture. In this regard, the metal patch 1101 may be defined as a circular patch having an outer side shape in a circular form as shown in FIG. 4B. However, the shape of the metal patch

1101 is not limited thereto, and may be defined as a rectangular patch having an outer side shape in a rectangular form.

On the other hand, an inner side shape of the metal patch 1101 may be disposed in a circular shape to correspond to a shape of an outer line of the upper aperture regardless of the outer side shape of the metal patch 1101 Through this, a signal radiated from the cone radiator 1100R may be coupled through an inner side of the metal patch 1101.

On the other hand, the metal patch 1101 may be disposed at only one side to surround a partial region of an upper opening of the cone antenna 1100. Accordingly, an overall size of the cone antenna 1100 including the metal patch 1101 may be minimized. However, the shape and arrangement form of the metal patch 1101 is not limited to a circular patch disposed at only one side of the upper opening. Accordingly, the metal patch 1101 can be implemented as a rectangular patch disposed at one side, circular patches disposed at both sides, or rectangular patches disposed at both sides. The shape and arrangement form of the metal patch 1101 will be described in detail below.

Meanwhile, the power feeder 1105 is disposed on the second substrate S2 and configured to transmit a signal through a lower aperture. To this end, an end portion of the power feeder 1105 may be defined in a ring shape to correspond to a shape of the lower aperture.

Meanwhile, the dielectric 1105*a* may have a cylindrical shape to surround the lower aperture of the cone radiator 1100R. Referring to FIGS. 5A and 5B, the dielectric 1105*a* may be defined in a three-dimensional sector form from which the dielectric is partially removed in a predetermined angular range in a region where a transmission line of the power feeder 1105 is disposed. Accordingly, the three-dimensional sector-shaped dielectric 1105*a* may be disposed above an end portion of the ring-shaped power feeder 1105 to reduce a ring diameter of the end portion of the power feeder 1105 and increase a diameter of the lower aperture. For example, when the dielectric is not disposed above the power feeder as shown in FIG. 4A, a diameter of a lower cone of the radiator may be 3 mm. On the contrary, when the dielectric 1105*a* is disposed above the power feeder 1105 as shown in FIGS. 4B to 6, the diameter of the lower cone of the radiator 1100R may be 5 mm.

Figure 7A:
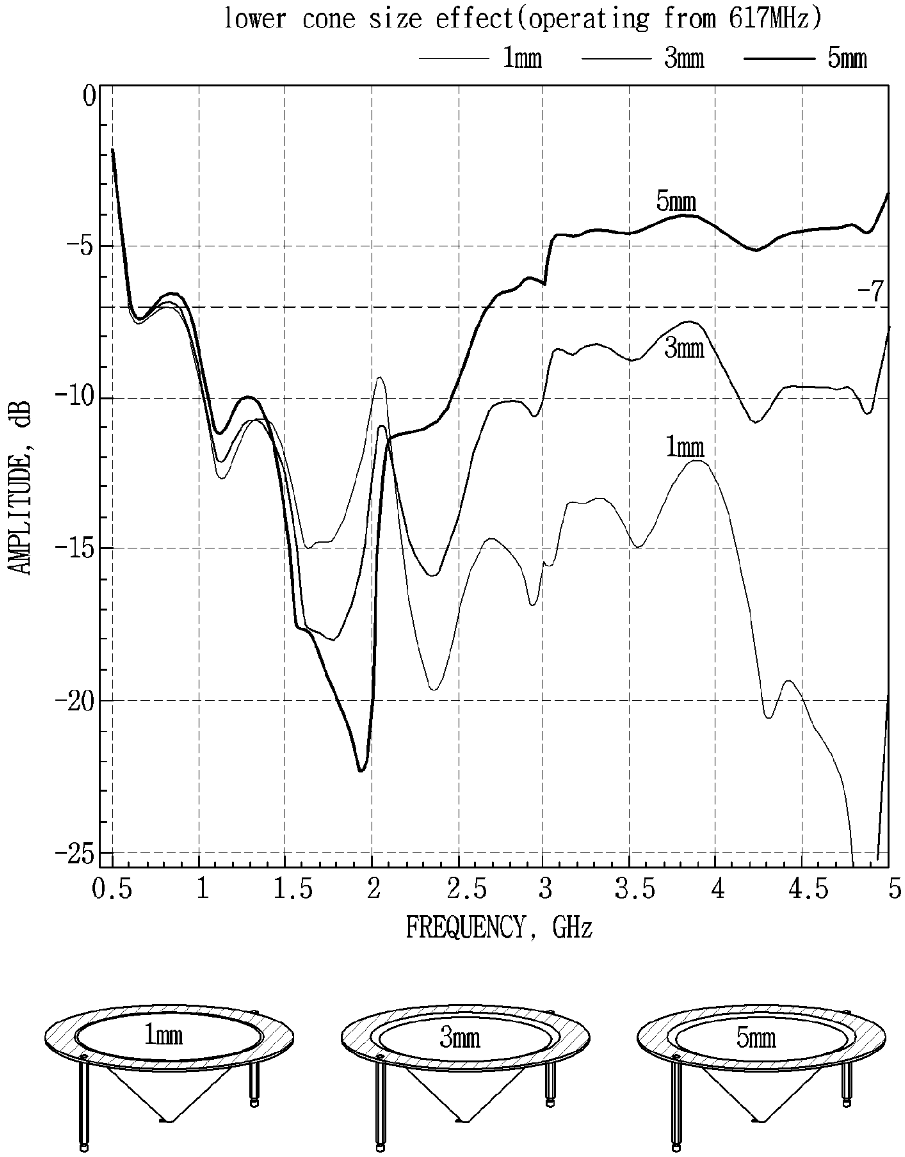
FIGS. 7A and 7B show reflection coefficient characteristics according to a change in a lower diameter of the cone antenna according to the present disclosure.
Figure 7B:
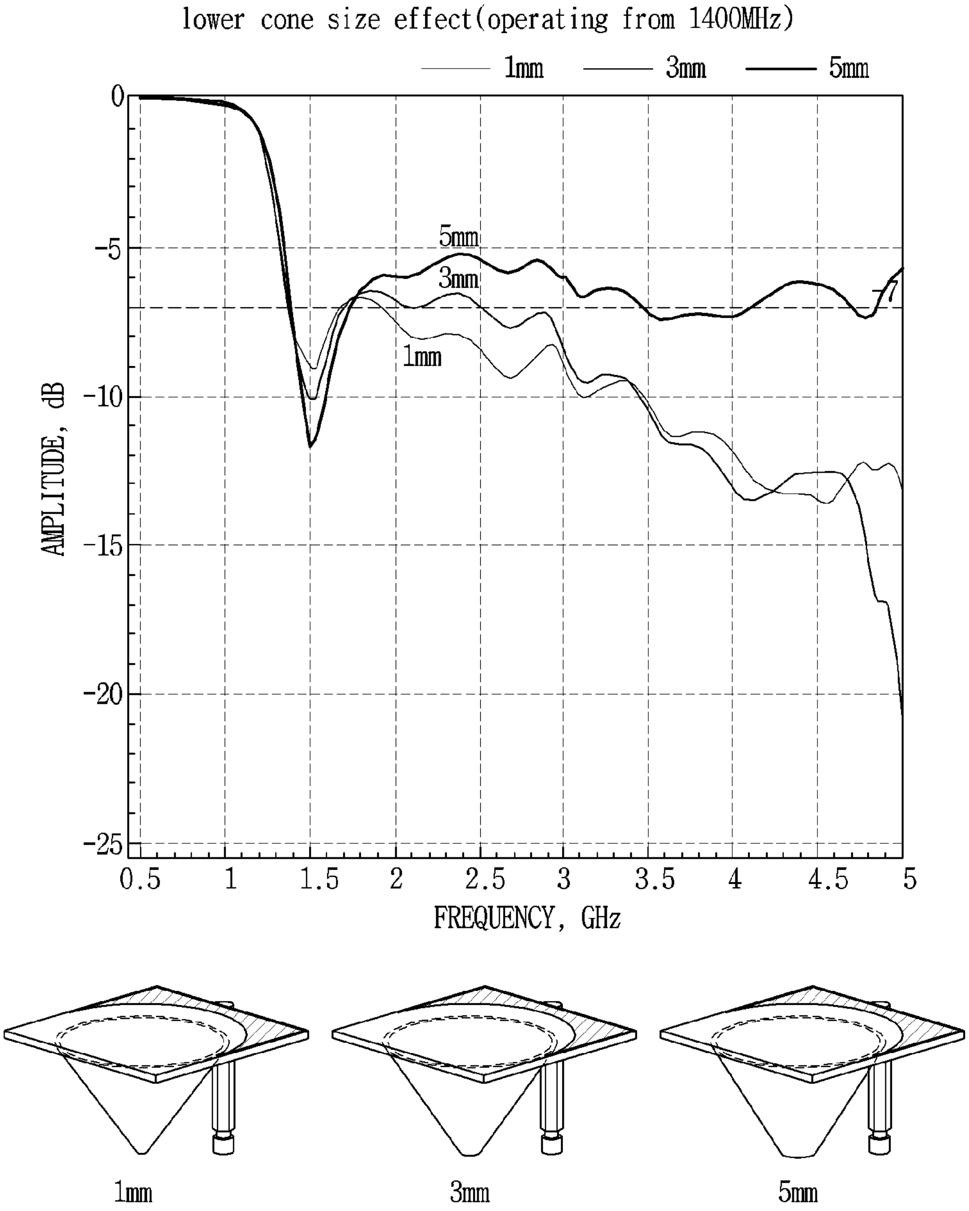

In this regard, FIGS. 7A and 7B show reflection coefficient characteristics according to a change in a lower diameter of the cone antenna according to the present disclosure. Specifically, FIG. 7A shows reflection coefficient characteristics for a cone antenna having two shorting pins and a circular patch operating from a low frequency (614 MHz). On the contrary, FIG. 7B shows reflection coefficient characteristics for a cone antenna having a single shorting pin and a rectangular patch operating from a mid frequency (1400 MHz). Specifically, FIG. 7B corresponds to the cone antenna 1100 having the single shorting pin 1102 and the metal patch 1101 in a rectangular patch form at one side of the radiator 1100R. In FIGS. 7A and 7B, a lower diameter of the cone antenna may be changed to 1 mm, 3 mm, and 5 mm, respectively, by 2 mm.

In this case, it can be seen that matching characteristics are improved in a high frequency band as a size of the lower diameter of the cone antenna 1100 decreases. Furthermore, it can be seen that bandwidth characteristics are improved as the size of the lower diameter of the cone radiator 1100R decreases. Therefore, referring to FIG. 7B in connection with the present disclosure, when the size of the lower diameter of the cone antenna 1100 is reduced, the antenna characteristics are improved. However, when the lower diameter of the cone antenna 1100 is implemented to be small, there is a problem in that it is difficult to stably support the cone radiator 1100R.

Figure 8A:
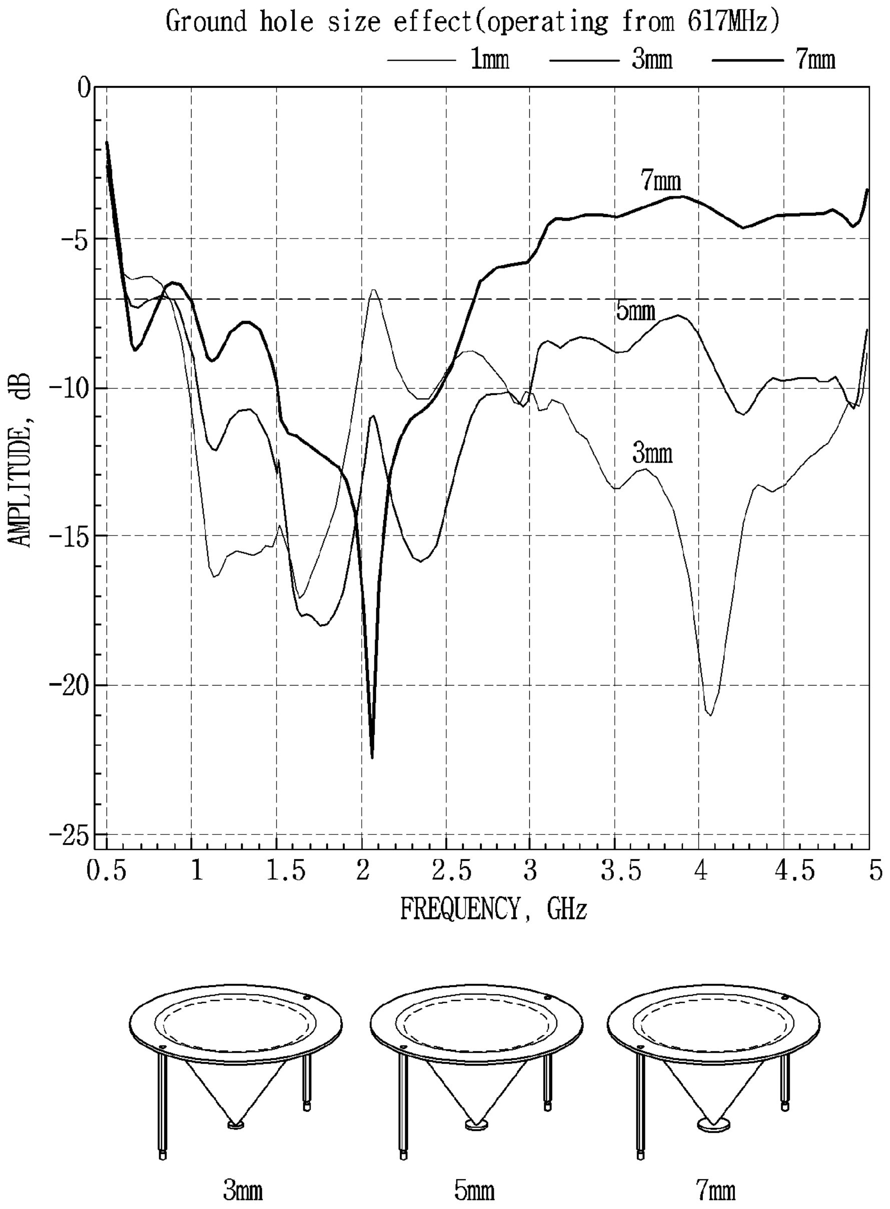
FIGS. 8A and 8B show reflection coefficient characteristics according to a change in a ground hole size of a lower substrate to which a cone radiator according to the present disclosure is fixed. On the other hand.
Figure 8B:
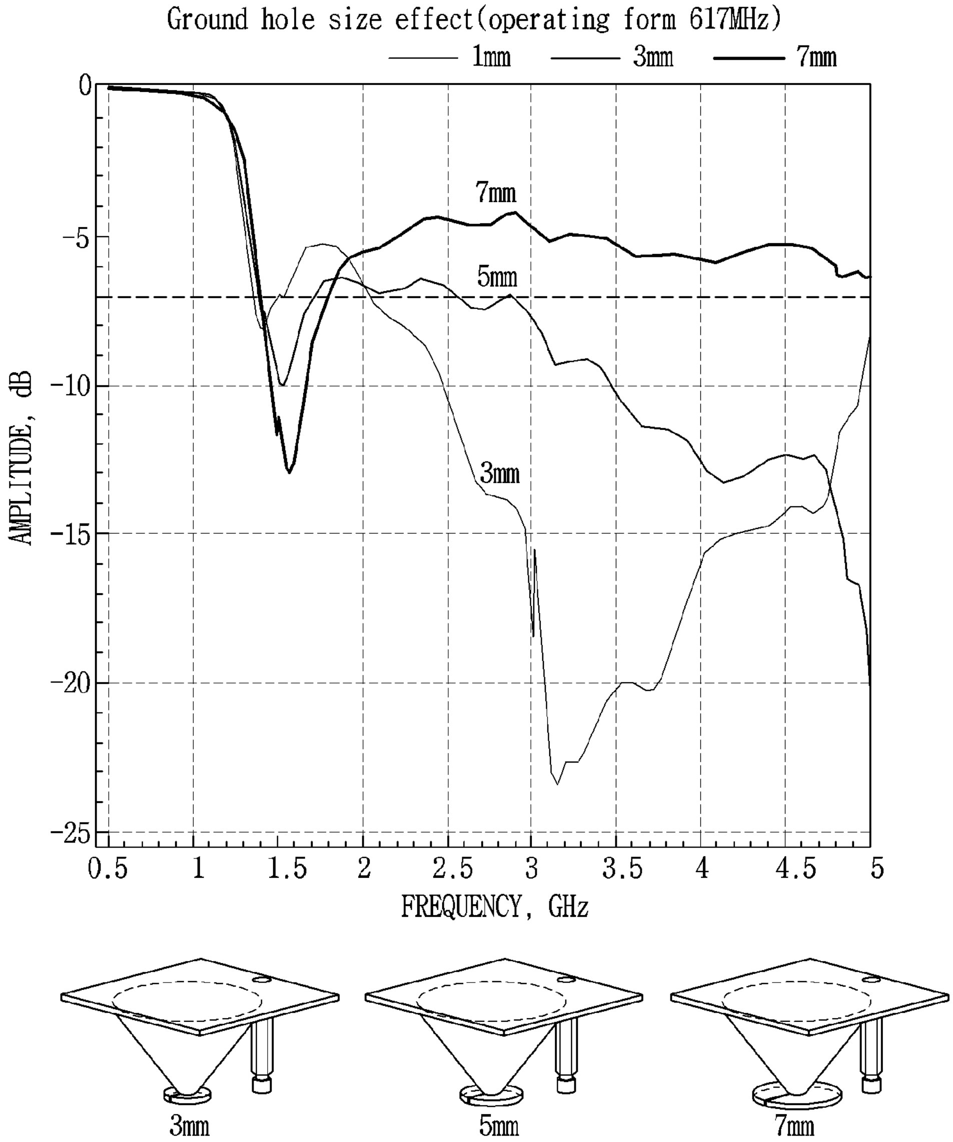

On the other hand, FIGS. 8A and 8B show reflection coefficient characteristics according to a change in a ground hole size of a lower substrate to which a cone radiator according to the present disclosure is fixed. Specifically, FIG. 8A shows reflection coefficient characteristics for a cone antenna having two shorting pins and a circular patch operating from a low frequency (614 MHz). On the contrary, FIG. 8B shows reflection coefficient characteristics for a cone antenna having a single shorting pin and a rectangular patch operating from a mid frequency (1400 MHz).

Specifically, FIG. 8B corresponds to the cone antenna 1100 having the single shorting pin 1102 and the metal patch 1101 in a rectangular patch form at one side of the radiator 1100R. In FIGS. 8A and 8B, the ground hole size may be changed to 3 mm, 5 mm, 7 mm, respectively, by 2 mm. Here, the term "ground hole" region refers to a region in which the ground is removed in the form of a hole in a region corresponding to a lower region of the cone radiator 1100R from the ground of a rear surface of the second substrate.

On the other hand, it can be seen that matching characteristics are improved in a high frequency band as the ground hole size decreases on a rear surface of the second substrate. Furthermore, it can be seen that bandwidth characteristics are improved as the ground hole size of the cone radiator 1100R decreases. In particular, as the ground hole size of the cone radiator 1100R decreases, antenna performance is improved in mid and high bands. In this regard, referring to FIG. 8B, when the ground hole size on a rear surface of the second substrate of the cone antenna 1100 is implemented to be small, reflection coefficient characteristics are improved in mid and high bands. However, when the ground hole size on a rear surface of the second substrate is implemented to be small, there is a problem in that it is difficult to stably support the cone radiator 1100R.

In this regard, there is an advantage that a rear surface of the second substrate may be filled with the ground through the cone radiator 1100R having the dielectric 1105*a* according to the present disclosure. Accordingly, in the cone radiator 1100R having the dielectric 1105*a*, a height of the cone radiator 1100R or a diameter of the upper aperture decreases while a diameter of the lower aperture increases to improve mechanical stability. In addition, according to the present disclosure, a size of the cone radiator 1100R itself as well as a size of an end portion of the power feeder 1105 may be reduced. As a result, according to the present disclosure, a diameter of the lower aperture of the cone radiator 1100R may be increased, thereby improving mechanical stability while at the same time improving electrical characteristics (e.g., bandwidth characteristics) of the cone radiator 1100R.

Figure 8C:
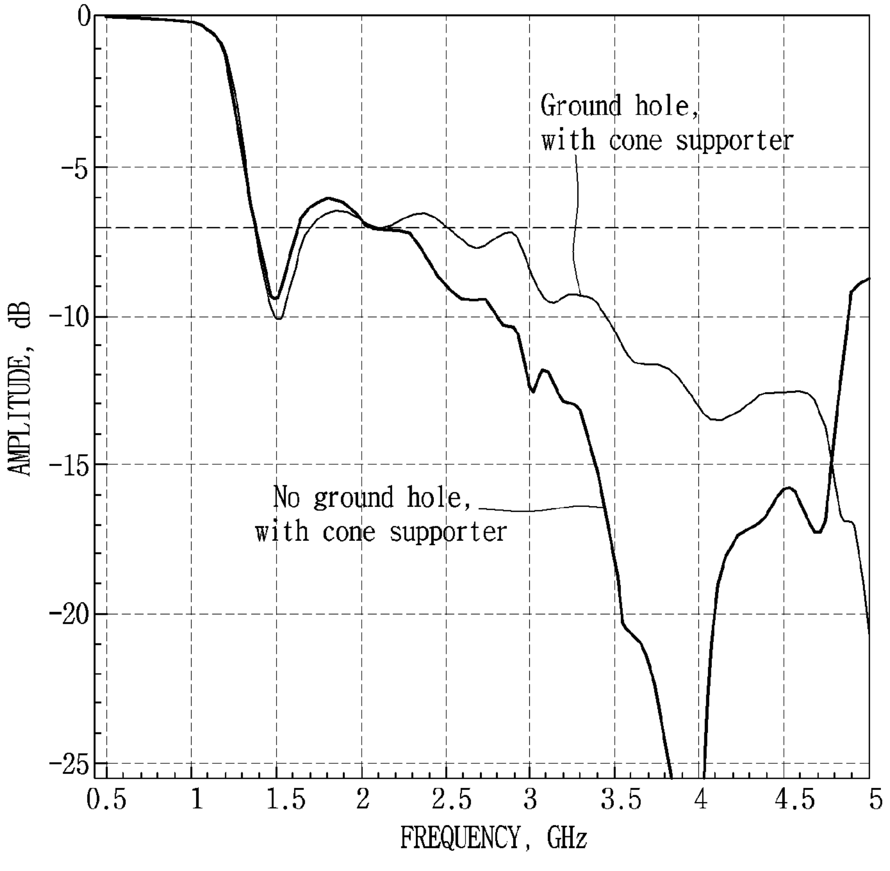
FIG. 8C shows reflection coefficient characteristics according to whether or not a ground pattern is removed according to the present disclosure.

On the other hand, FIG. 8C shows reflection coefficient characteristics according to whether or not a ground pattern is removed according to the present disclosure. Referring to FIG. 8C, when the ground pattern around the power feeder is removed (ground hole), the bandwidth is shifted to a high band, and it can be seen that the reflection coefficient characteristics are deteriorated in a desired band. Accordingly, when the ground pattern around the power feeder is removed (ground hole), insertion loss characteristics may also be deteriorated. On the contrary, it can be seen that the reflection coefficient characteristics in the relevant band is good when there exists a ground pattern around the power feeder (no ground hole). Accordingly, when there is a ground pattern around the power feeder (no ground hole), it has low insertion loss characteristics.

In addition, in the present disclosure, since the dielectric 1105*a* is disposed above the power feeder 1105, there is an advantage in that a metal may be disposed in an entire region of the ground layer GND of the second substrate S2. In this regard, when the dielectric is not disposed above the power feeder as shown in FIG. 4A, a diameter of a hole from which a ground corresponding to the power feeder 1105 is removed may be 10 mm. In this regard, the cone antenna has an open region in which a metal is removed from a region corresponding to a size due to the ground hole corresponding to the power feeder.

On the contrary, when the dielectric 1105*a* is disposed above the power feeder 1105 as shown in FIGS. 4B to 6, a ground corresponding to the power feeder 1105 is not removed. Accordingly, a hole diameter from which the ground is removed may be 0 mm. Accordingly, an end portion of the power feeder 1105 of the present disclosure and a lower region of a transmission line region connected to the end portion are characterized in that the ground layer GND of the second substrate S2 is filled without being removed.

Therefore, the present disclosure is to solve the limitation of routing by a signal line or the like due to an open region from which a metal is removed as described above. To this end, in the present disclosure, polycarbonate (PC) cone supporter such as the dielectric 1105*a* is used above the power feeder 1105. Accordingly, the dielectric 1105*a* disposed above the power feeder 1105 may be referred to as a cone supporter 1105*a*.

Meanwhile, the shorting pin 1102 is disposed to electrically connect the metal patch 1101 and the ground layer GND of the second substrate S2. On the other hand, the shorting pin 1102 may be implemented in a structure in which a fastener such as a screw having a predetermined diameter is inserted into a structure such as a dielectric.

In this regard, in order to arrange a plurality of cone antennas in an electronic device, the cone antennas need to be implemented with a small size. For this purpose, the cone antenna structure according to the present disclosure may be referred to as a "cone with a shorting pin" or a "cone with a shorting supporter".

In this regard, the number of shorting pins or shorting supporters may be one or two. Specifically, the number of shorting pins or shorting supports may not be limited thereto and may be changed according to applications. However, in the "cone with a shorting pin" or the "cone with a shorting supporter" according to the present disclosure, one or two shorting pins or shorting supporters may be implemented to reduce a size of the antenna.

Specifically, the shorting pin 1102 may be provided with a single shorting pin between the metal patch 1101 and the second substrate S2. By such a single shorting pin 1102, a null of a radiation pattern of the cone antenna may be prevented from being generated. The operation principle and technical characteristics thereof will be described in detail with reference to FIGS. 11A and 11B.

In this regard, in a typical cone antenna, a null of the radiation pattern may be generated from boresight in an elevation angle direction, thereby deteriorating reception performance. In order to solve this problem, in the present disclosure, the null of the radiation pattern may be removed from boresight in the elevation angle direction through a structure in which the cone antenna 1110 is connected to a single shorting pin 1102. Accordingly, the present disclosure has an advantage in that reception performance can be improved in almost all directions.

In this regard, referring to FIG. 4B, the cone antenna with a single shorting pin forms a current path of the power feeder 1105—the cone radiator 1100R—the metal patch 1101—the shorting pin 1102—the ground layer GND. In this way, through an asymmetric current path of the power feeder 1105—the cone radiator 1100R—the metal patch 1101—the shorting pin 1102—the ground layer GND, a null of the radiation pattern may be prevented from being generated from boresight in the elevation angle direction.

Meanwhile, as described above, the shorting pin 1102 may be provided with a screw having a predetermined diameter configured to vertically connect between the metal patch 1101 and the second substrate S2. In this regard, a height of the shorting pin 1102 may be set to 2 mm and a diameter thereof to 1.5 mm. However, the height and diameter of the shorting pin 1102 are not limited thereto and may be changed according to its application.

On the other hand, it may be difficult to ensure mechanical stability only with the shorting pin 1102 having such a specific diameter. Accordingly, in order to secure mechanical stability by the shorting pin 1102, a second dielectric 1102*a* may be further included. In other words, the second dielectric 1102*a* is provided to surround a screw corresponding to the shorting pin 1102, and has a cylindrical shape having a predetermined diameter.

On the other hand, a cone antenna according to the present disclosure may further include at least one non-metal supporter 1106 to mechanically fix the cone radiator 1100R to the first substrate S1 and the second substrate S2. To this end, the non-metal supporter 1106 is configured to vertically connect the first substrate S1 and the second substrate S2 to support the first substrate S1 and the second substrate S2. On the other hand, since the non-metal supporter 1106 is not a metal and is not electrically connected to the metal patch 1101, the electrical characteristics of the cone antenna 1100 are not affected. Accordingly, the non-metal supporter 1106 may be disposed on an upper left portion, an upper right portion, a lower left portion, and a lower right portion of the first and second substrates S1 and S2 to vertically connect and support the first and second substrates S1 and S2. However, the present disclosure is not limited thereto, and may be modified into various structures capable of supporting the first substrate S1 and the second substrate S2.

Meanwhile, the plurality of outer rims 1103 constitute an upper aperture of the cone radiator 1100R, and are configured to connect the cone antenna to the first substrate S1. Accordingly, the outer rim 1103 may be integrally formed with the cone radiator 1100R, and may be connected to the first substrate S1 through the fasteners 1104. Furthermore, the plurality of fasteners 1104 are configured to connect the outer rims 1103 and the first substrate S1.

Here, the outer rims 1103 and the fasteners 1104 may be implemented with two outer rims at opposing points of the cone radiator 1100R. However, the number of the outer rims 1103 and the fasteners 1104 is not limited thereto, and may be implemented with three or more outer rims depending on the application.

On the other hand, the fastener 1107 may be configured to be connected to the second substrate S2 through an inside of an end portion (i.e., a ring shape) of the power feeder 1105. Accordingly, the second substrate S2 on which the power feeder 1105 is disposed and the cone radiator 1100R may be fixed through the fastener 1107. Accordingly, the fastener 1107 performs a role of fixing the cone radiator 1100R to the second substrate S2 as well as a role of a power feeder that transmits a signal to the cone radiator 1100R.

On the other hand, there is no ground-removed hole on the second substrate S2 through a lower part of the cone antenna and the power feeder disposed with the dielectric. Accordingly, the ground layer GND may be entirely disposed on a rear surface of the second substrate S2, thereby increasing a degree of freedom in positioning routing line by a signal line.

In this regard, FIG. 6 shows a configuration in which an antenna layer and a transceiver circuit layer are disposed according to the present disclosure. In this regard, the antenna layer may be the first substrate S1 corresponding to an upper substrate. Meanwhile, the transceiver circuit layer may be the second substrate S2 and/or a third substrate S3 corresponding to the lower substrate. In this regard, the third substrate S3 may be disposed below the second substrate S2. Here, the transceiver circuit 1250 may be connected to the cone radiator 1100R through the power feeder 1105, and may control a signal to be radiated through the cone antenna 1100. To this end, the transceiver circuit 1250 may control an operation of a transmitter or receiver circuit connected to the cone antenna 1100. Specifically, the transceiver circuit 1250 may control the output power of a power amplifier (PA) of the transmitter. In addition, the transceiver circuit 1250 may adjust a gain of a low noise amplifier (LNA) of the receiver.

On the other hand, when the transceiver circuit 1250 is disposed on the second substrate S2, a connection length to the power feeder 1105 may be reduced. On the contrary, when the transceiver circuit 1250 is disposed on the third substrate S3, it is advantageous in terms of mounting space, and when a plurality of cone antennas 1100 are disposed, interference with the cone antenna 1100 is also reduced.

Accordingly, when the cone antenna is used in a 5G millimeter band, it may be advantageous that the transceiver circuit 1250 is disposed on the second substrate S2. On the contrary, when the cone antenna is used in an LTE band and a 5G sub-6 band, it may be advantageous that the transceiver circuit 1250 is disposed on the second substrate S2.

In this regard, the transceiver circuit 1250 may be disposed on a bottom surface of the third substrate S3. Meanwhile, a signal line (SL) may be disposed on a rear surface S3B of the third substrate S3 corresponding to a hole region H (i.e., a filled ground layer) of the second substrate S2 that is filled with the ground. Accordingly, a signal loss due to the signal line SL may be reduced by the filled ground layer H corresponding to the signal line SL compared to the ground structure of FIG. 4A. Here, the ground structure of FIG. 4A is a ground structure in which a ground layer corresponding to a lower region of the cone radiator around the power feeder is removed.

Meanwhile, in the cone antenna 1100 having the dielectric 1105*a* around a lower opening according to the present disclosure, the metal patch 1101 may be configured as a circular patch. However, the present disclosure is not limited thereto, and the metal patch 1101 may be implemented as a circular patch or a metal patch having any polygonal structure depending on the application.

Figure 9A:
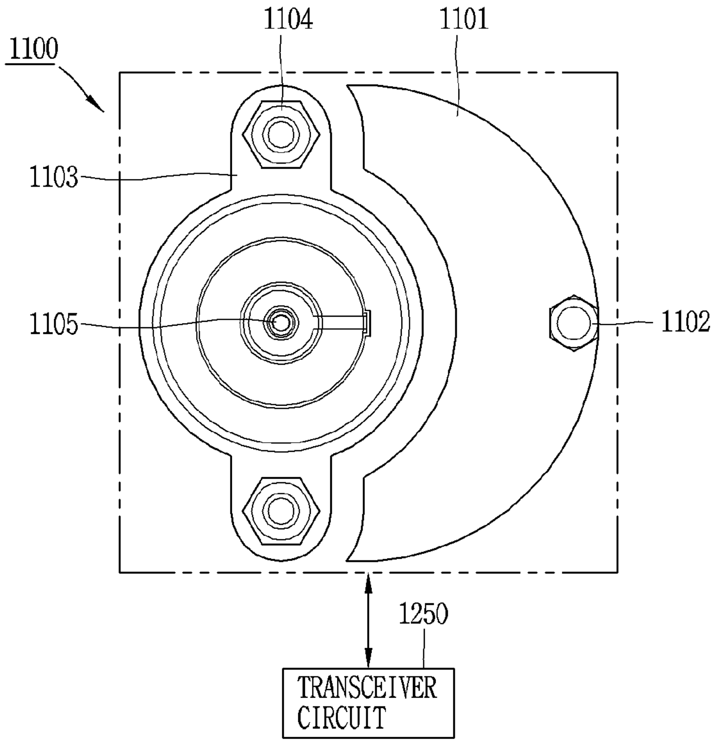
FIGS. 9A and 9B are front views showing a cone antenna having a structure of a cone with a single shorting pin according to various embodiments of the present disclosure.
Figure 9B:
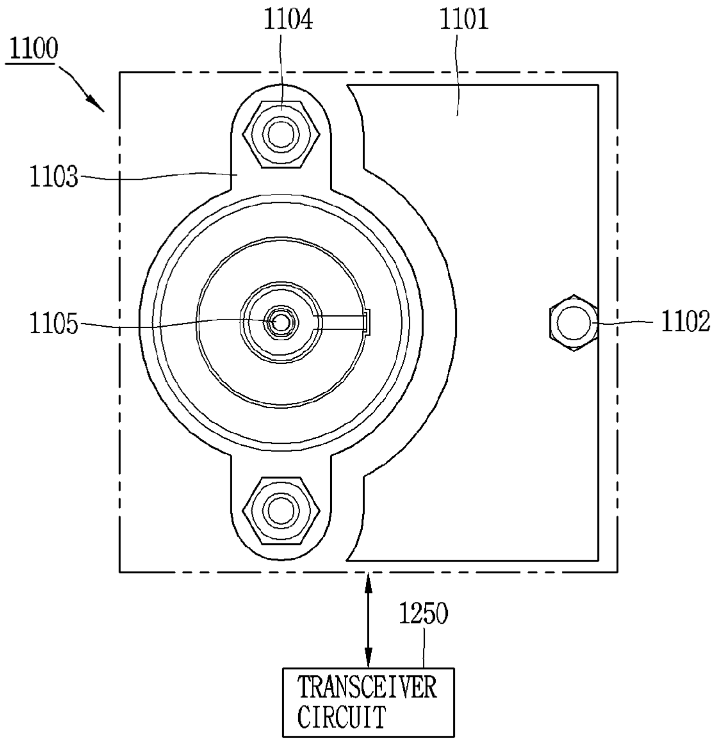

On the other hand, FIGS. 9A and 9B are front views showing a cone antenna having a structure of a cone with a single shorting pin according to various embodiments of the present disclosure. In other words, FIGS. 9A and 9B show a cone antenna implemented by one radiator with a single shorting pin. Here, a metal patch 1101, 1101' may be disposed at only one side of the cone radiator 1102 as shown in FIGS. 9A and 9B. In this regard, in the case of the circular patch 1101 in FIG. 8A, an inner side of the metal patch 1101 may be defined in a circular shape to correspond thereto.

Meanwhile, a cone structure with a single shorting pin as shown in FIGS. 9A and 9B may be implemented by a single shorting pin (or a shorting supporter). Specifically, FIG. 8A shows a shape in which a metal patch having a circular shape is disposed on one side of an upper opening of the cone radiator. On the contrary, FIG. 8B shows a shape in which a rectangular metal patch is disposed on one side of the upper opening of the cone radiator.

Referring to FIGS. 9A and 9B, an electronic device according to the present disclosure includes the cone antenna 1100. Furthermore, the electronic device may further include a transceiver circuit 1250.

Meanwhile, referring to FIGS. 9A and 9B, the cone antenna 1100 is disposed between a first substrate, which is an upper substrate, and a second substrate, which is a lower substrate. On the other hand, the cone antenna 1100 may include metal patches 1101, 1101', 1101*a*, 1101*b*, and the shorting pin 1102. Here, the metal patch 1101 may be disposed in a surrounding region of one side of the upper aperture of the cone antenna 1100. In this regard, the metal patch 1101 may be disposed on the first substrate. Here, the cone antenna 1100 may refer to only a hollow cone antenna or refer to an entire antenna structure including the metal patch 1101.

Specifically, the metal patches 1101, 1101', 1101*a*, 1101*b* may be disposed in a surrounding region of the upper aperture of the cone antenna 1100, and disposed above the first substrate. Accordingly, the metal patch 1101 may be disposed at a position spaced apart from the upper aperture of the cone antenna 1100 in a z-axis by a thickness of the first substrate. As such, when the metal patch 1101 is disposed above the first substrate, there is an advantage in that a size of the cone antenna 1100 can be further reduced. Specifically, since the first substrate having a predetermined dielectric constant is disposed in an upper region of the cone antenna 1100 including the metal patch 1101, there is an advantage in that the size of the cone antenna 1100 can be further reduced.

Alternatively, the metal patches 1101, 1101', 1101*a*, 1101*b* may be disposed in a surrounding region of the upper aperture of the cone antenna 1100, and disposed below the first substrate. Accordingly, the metal patch 1101 may be spaced apart from the upper aperture of the cone antenna 1100 by a predetermined gap on the same plane on the z-axis. When the metal patch 1101 is disposed below the first substrate as described above, the first substrate may operate as a radome of the cone antenna 1100 including the metal patch 1101. Accordingly, there is an advantage in that the cone antenna 1100 including the metal patch 1101 can be protected from the outside and a gain of the cone antenna 1100 can be increased.

The shorting pin 1102 is configured to connect between the metal patch 1101, 1101', 1101*a*, 1101*b* and the ground layer GND disposed on the second substrate. As such, there is an advantage in that the size of the cone antenna 1100 can be reduced by the shorting pin 1102 configured to connect between the metal patch 1101 and the ground layer GND disposed on the second substrate. Meanwhile, the number of shorting pins 1102 may be one or two. A case where the number of shorting pins 1102 is one may be most advantageous in terms of reducing the size of the cone antenna 1100. Accordingly, the shorting pin 1102 may be defined as a single shorting pin between the metal patch and the second substrate, which is a lower substrate. However, the number of shorting pins may not be limited thereto, and two or more shorting pins may be used in terms of performance and structural stability of the cone antenna 1100. Depending on the application, some pins other than the shorting pin 1102 may be implemented as non-metal supporting pins in a non-metallic form.

The transceiver circuit 1250 may be connected to the cone radiator 1100R through the power feeder 1105, and may control a signal to be radiated through the cone antenna 1100. In this regard, the transceiver circuit 1250 may include a power amplifier 210 and a low-noise amplifier 310 at a front stage as shown in FIG. 2. Accordingly, the transceiver circuit 1250 may control the power amplifier 210 to radiate a signal amplified through the power amplifier 210 through the cone antenna 1100. Furthermore, the transceiver circuit 1250 may control the low noise amplifier 310 to amplify a signal received from the cone antenna 1100 through the low noise amplifier 310. In addition, the transceiver circuit 1250 may control elements inside the transceiver circuit 1250 to transmit and/or receive a signal through the cone antenna 1100.

In this regard, when the electronic device includes a plurality of cone antennas, the transceiver circuit 1250 may control a signal to be transmitted and/or received through at least one of the plurality of cone antennas. A case where the transceiver circuit 1250 transmits or receives a signal through only one cone antenna may be referred to as 1 Tx or 1 Rx, respectively. On the contrary, a case where the transceiver circuit 1250 transmits or receives a signal through two or more cone antennas may be referred to as n Tx or n Rx depending on the number of antennas.

For example, a case where the transceiver circuit 1250 transmits or receives a signal through two cone antennas may be referred to as 2 Tx or 2 Rx. However, a case where the transceiver circuit 1250 transmits or receives first and second signals having the same data through two cone antennas may be referred to as 1 Tx or 2 Rx. A case where the transceiver circuit 1250 transmits or receives the first and second signals having the same data through the two cone antennas as described above may be referred to as a diversity mode.

On the other hand, the metal patch 1101 may have a circular patch form as shown in FIG. 8A.

Furthermore, the metal patch 1101 may have a rectangular patch form as shown in FIG. 8B. In this regard, the metal patch 1101 may be implemented in a circular patch form or any polygonal patch form from the viewpoint of antenna downsizing and performance depending on the application. In this regard, any polygonal patch form may be approximated to a circular patch form as the order of the polygon increases.

Referring to FIG. 9A, the metal patch 1101 may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101, thereby having an advantage capable of optimizing the performance of the antenna.

Referring to FIG. 9B, the metal patch 1101' may be defined as a rectangular patch having an outer side shape in a rectangular form. On the other hand, an inner side shape of the rectangular patch may be defined in a circular shape to correspond to the shape of the outer line of the upper aperture. Accordingly, the signal radiated from the cone antenna may be formed to be coupled through an inner side of the rectangular patch 1101, thereby having an advantage capable of optimizing the performance of the antenna.

Figure 10A:
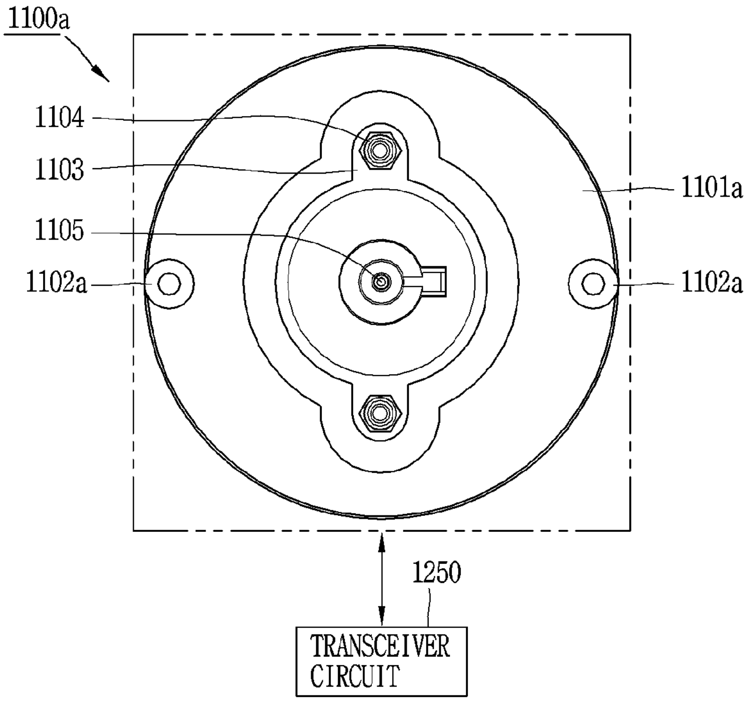
FIGS. 10A and 10B are views showing an electronic device provided with a cone antenna having a structure of a cone with two shorting pins according to an embodiment of the present disclosure.
Figure 10B:
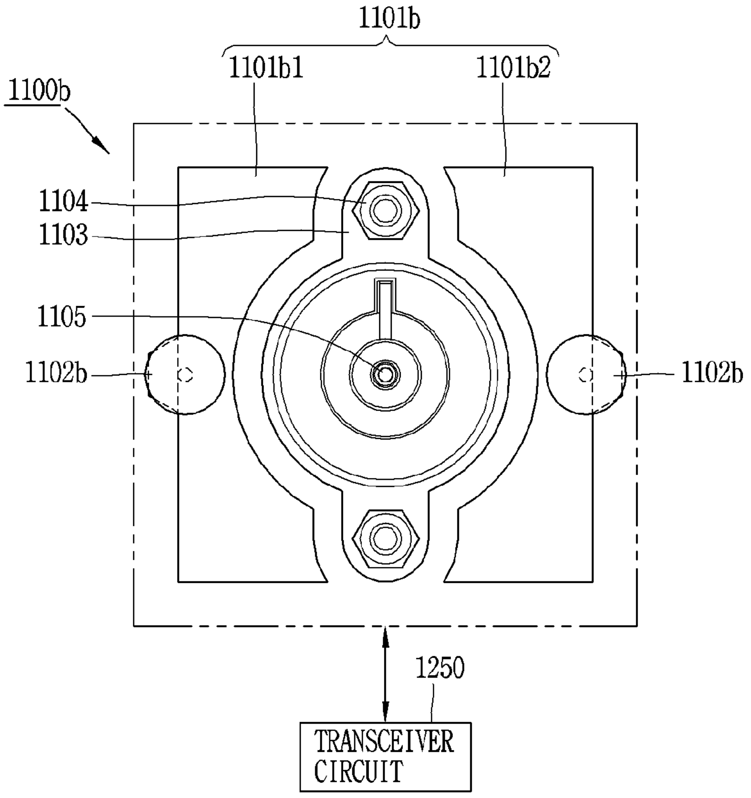

On the other hand, FIGS. 10A and 10B are views showing an electronic device provided with a cone antenna having a structure of a cone with two shorting pins according to an embodiment of the present disclosure. In this regard, the structure of a cone with two shorting pins is a cone antenna implemented by two shorting pins (or shorting supporters). Here, the structure of FIGS. 10A and 10B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102*a* of FIG. 9A may be replaced with the non-metal supporter 1106 of FIG. 4A. Accordingly, one of the non-metal supporters 1106 may be disposed in a metal patch disposed on the other side.

Referring to FIGS. 10A and 10B, the electronic device according to the present disclosure includes the cone antenna 1100*a*. Furthermore, the electronic device may further include the transceiver circuit 1250.

Meanwhile, referring to FIGS. 4A to 10B, the cone antenna 1100*a* is disposed between a first substrate, which is an upper substrate, and a second substrate, which is a lower substrate. Meanwhile, the cone antenna 1100*a* may include a metal patch 1101*a* and the shorting pin 1102*a*. Here, the metal patch 1101*a* may be disposed in a surrounding region of the upper aperture of the cone antenna 1100*a*. In this regard, the metal patch 1101 may be disposed on the first substrate.

On the other hand, the metal patch 1101*a* may be implemented as a circular patch to surround the entire upper aperture of the cone antenna 1100*a*. However, the present disclosure is not limited thereto, and the metal patch 1101*a* may be implemented as a circular patch that surrounds a part of the upper aperture of the cone antenna 1100*a*. Accordingly, the circular patch may be disposed at both sides of the upper aperture of the cone antenna 1100*a* or may be disposed at one side thereof.

Accordingly, in the cone antenna 1100*a* according to the present disclosure, the circular patch 1101*a* may be disposed in an entire region to surround an entire region of the upper aperture of the cone antenna 1100*a*. Specifically, a metal patch such as the circular patch 1101*a* may be disposed at both one side and the other side corresponding to the one side so as to surround the entire region of the upper opening of the cone antenna.

Accordingly, the cone antenna 1100*a* having the symmetrical circular patch 1101*a* and the shorting pins 1102*a* may have a slightly increased overall size compared to a case where the metal patch disposed at only one side thereof is provided. However, the cone antenna 1100*a* having the symmetrical circular patch 1101*a* and the shorting pin 1102*a* has an advantage in that the radiation pattern is symmetrical and can be implemented with broadband characteristics.

On the other hand, in the cone antenna 1100*a* according to the present disclosure, the circular patch 1101*a* may be disposed in only a partial region to surround a partial region of the upper aperture. Accordingly, there is an advantage in that the size of the cone antenna 1100*a* including the metal patch 1101*a* can be minimized.

Specifically, the metal patch 1101*a* may be disposed in a surrounding region of the upper aperture of the cone antenna 1100*a*, and disposed above the first substrate. Accordingly, the metal patch 1101*a* may be disposed at a position spaced apart from the upper aperture of the cone antenna 1100*a* in the z-axis by a thickness of the first substrate. As such, when the metal patch 1101*a* is disposed above the first substrate, there is an advantage in that a size of the cone antenna 1100*a* can be further reduced. Specifically, since the first substrate having a predetermined dielectric constant is disposed in an upper region of the cone antenna 1100 including the metal patch 1101*a*, there is an advantage in that the size of the cone antenna 1100 can be further reduced.

Alternatively, the metal patch 1101 may be formed in a peripheral area of the upper aperture of the cone antenna 1100*a* and disposed under the first substrate. Accordingly, the metal patch 1101*a* may be spaced apart from the upper aperture of the cone antenna 1100*a* by a predetermined gap on the same plane on the z-axis. When the metal patch 1101*a* is disposed below the first substrate as described above, the first substrate may operate as a radome of the cone antenna 1100*a* including the metal patch 1101*a*. Accordingly, there is an advantage in that the cone antenna 1100*a* including the metal patch 1101*a* can be protected from the outside and a gain of the cone antenna 1100*a* can be increased.

The shorting pin 1102*a* is configured to connect between the metal patch 1101*a* and the ground layer GND disposed on the second substrate. As such, there is an advantage in that the size of the cone antenna 1100*a* can be reduced by the shorting pin 1102*a* configured to connect between the metal patch 1101*a* and the ground layer GND disposed on the second substrate.

The transceiver circuit 1250 may be connected to the cone antenna 1100*b* to control a signal to be radiated through the cone antenna 1100*b*. The detailed description related thereto will be replaced with the description in FIGS. 5A and 5B.

Referring to FIG. 10A, the metal patch 1101*a* may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101*a*, thereby having an advantage capable of optimizing the performance of the antenna.

Meanwhile, a resonance length may be defined by an aperture of the metal patch 1101*a* having an aperture size larger than that of the upper aperture of the cone antenna. Accordingly, a signal radiated from the cone antenna 1100*a* may be coupled through an inner side of the circular patch 1101*a*. Accordingly, there is an advantage in that a size of the cone antenna 1100*a* can be reduced by the aperture of the circular patch 1101*a* having an aperture size larger than that of the upper aperture of the cone antenna.

On the other hand, FIG. 10B is a view showing an electronic device provided with a cone antenna having a structure of a cone with two shorting pins according to another embodiment of the present disclosure. In this regard, the structure of a cone with two shorting pins is a cone antenna implemented by two shorting pins (or shorting supporters). Here, the structure of FIGS. 9A and 9B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102*b* of FIG. 6B may be replaced with the non-metal supporter 1106 of FIG. 4A. Accordingly, one of the non-metal supporters 1106 may be disposed in a metal patch 1101*b*1 on the other side.

Referring to FIG. 10B, the electronic device according to the present disclosure includes the cone antenna 1100*b*. Furthermore, the electronic device may further include the transceiver circuit 1250.

Meanwhile, referring to FIGS. 4 to 9B, the cone antenna 1100*b* is disposed between a first substrate, which is an upper substrate, and a second substrate, which is a lower substrate. Meanwhile, the cone antenna 1100*b* may include a metal patch 1101*b* and the shorting pins 1102*b*. Here, the metal patch 1101*b* may be disposed in a surrounding region of the upper aperture of the cone antenna 1100*b*. In this regard, the metal patch 1101 may be disposed on the first substrate.

On the other hand, the metal patch 1101*b* may be implemented as a rectangular patch to surround the entire upper aperture of the cone antenna 1100*b*. However, the present disclosure is not limited thereto, and the metal patch 1101*b* may be implemented as a rectangular patch that surrounds a part of the upper aperture of the cone antenna 1100*b*. Accordingly, the rectangular patch may be disposed at both sides of the upper aperture of the cone antenna 1100*b* or may be disposed at one side thereof.

Accordingly, in the cone antenna 1100*b* according to the present disclosure, the rectangular patch 1101*b* may be substantially disposed in an entire region to surround a region of the upper aperture of the cone antenna 1100*b*. In this regard, in order to reduce a size of the rectangular patch 1101*b*, the rectangular patch 1101*b* may not be disposed in a region around the fasteners 1104 supporting the cone antenna 1100*b*. Accordingly, the rectangular patches 1101*b* may be respectively disposed in left and right regions of the cone antenna 1100*b*.

In this regard, the metal patch 1101*b* may include a first metal patch 1101*b*1 and a second metal patch 1101*b*2. Specifically, the first metal patch 1101*b*1 may be disposed at a left side of the upper aperture of the cone antenna 1100*b* to surround the upper aperture. In addition, the second metal patch 1101*b*2 may be disposed at a right side of the upper aperture of the cone antenna 1100*b* to surround the upper aperture.

Accordingly, the first metal patch 1101*b* and the second metal patch 1101*b*2 are disposed to allow metal patterns thereof to be separated from each other, thereby reducing an overall size of the antenna. In this regard, when the first metal patch 1101*b* and the second metal patch 1101*b*2 are connected to each other, the metal patch 1101*b* may partially operate as a radiator. Accordingly, the bandwidth may be partially limited by an unwanted resonance due to the effect of the metal patch 1101*b* having a narrower bandwidth than the cone antenna 1100*b*.

In order to prevent such bandwidth limitation, the first metal patch 1101*b* and the second metal patch 1101*b*2 may be disposed to allow the metal patterns to be separated from each other. Accordingly, the cone antenna 1100*b* in which the metal patterns are separated from each other by the first metal patch 1101*b* and the second metal patch 1101*b*2 may operate as a broadband antenna. Accordingly, the first metal patch 1101*b* and the second metal patch 1101*b*2 may not be disposed in a region corresponding to the outer rim 1103 constituting the upper aperture.

Specifically, the rectangular patch 1101*b* may be disposed in a surrounding region of the upper aperture of the cone antenna 1100*b*, and disposed above the first substrate. Accordingly, the metal patch 1101*b* may be disposed at a position spaced apart from the upper aperture of the cone antenna 1100*b* in the z-axis by a thickness of the first substrate. As such, when the metal patch 1101*b* is disposed above the first substrate, there is an advantage in that a size of the cone antenna 1100*b* can be further reduced. Specifically, since the first substrate having a predetermined dielectric constant is disposed in an upper region of the cone antenna 1100 including the metal patch 1101*b*, there is an advantage in that the size of the cone antenna 1100*b* can be further reduced.

Alternatively, the rectangular patch 1101*b* may be disposed in a surrounding region of the upper aperture of the cone antenna 1100*b*, and disposed below the first substrate. Accordingly, the metal patch 1101*b* may be spaced apart from the upper aperture of the cone antenna 1100*b* by a predetermined gap on the same plane on the z-axis. When the metal patch 1101*b* is disposed below the first substrate as described above, the first substrate may operate as a radome of the cone antenna 1100*b* including the metal patch 1101*b*. Accordingly, there is an advantage in that the cone antenna 1100*b* including the metal patch 1101*b* can be protected from the outside and a gain of the cone antenna 1100*b* can be increased.

The shorting pins 1102*b* are configured to connect between the metal patch 1101*a* and the ground layer GND disposed on the second substrate. As such, there is an advantage in that the size of the cone antenna 1100*a* can be reduced by the shorting pin 1102*a* configured to connect between the metal patch 1101*a* and the ground layer GND disposed on the second substrate.

The transceiver circuit 1250 may be connected to the cone antenna 1100*b* to control a signal to be radiated through the cone antenna 1100*b*. The detailed description related thereto will be replaced with the description in FIG. 8.

Referring to FIG. 9B, the rectangular patch 1101*b* may be defined as a rectangular patch having an outer side shape in a rectangular form. Meanwhile, an inner side shape of the rectangular patch may be defined in a circular shape to correspond to a shape of an outer line of the upper aperture. Accordingly, the signal radiated from the cone antenna may be formed to be coupled through an inner side of the rectangular patch 1100*b*, thereby having an advantage capable of optimizing the performance of the antenna.

Meanwhile, a resonance length may be defined by a circular aperture of the rectangular patch 1101*b* having an aperture size larger than that of the upper aperture of the cone antenna. Accordingly, a signal radiated from the cone antenna 1100*b* may be coupled through an inner side of the rectangular patch 1101*b*. Accordingly, there is an advantage in that a size of the cone antenna 1100*b* can be reduced by the aperture of the rectangular patch 1101*b* having an aperture size larger than that of the upper aperture of the cone antenna.

Meanwhile, in the structure of FIGS. 8A to 9B, the dielectric 1105*a* may be disposed in a lower region of the cone radiator 1100R inside the metal patch 1101, 1101', 1101*a*, 1101*b*, and a rear surface of the second substrate S2 at a lower part of the power feeder 1105 may be filled with the ground. As such, a degree of design freedom in positioning routing line such as a signal line may be increased by the ground layer GND of the second substrate S2 filled with the ground.

Figure 11A:
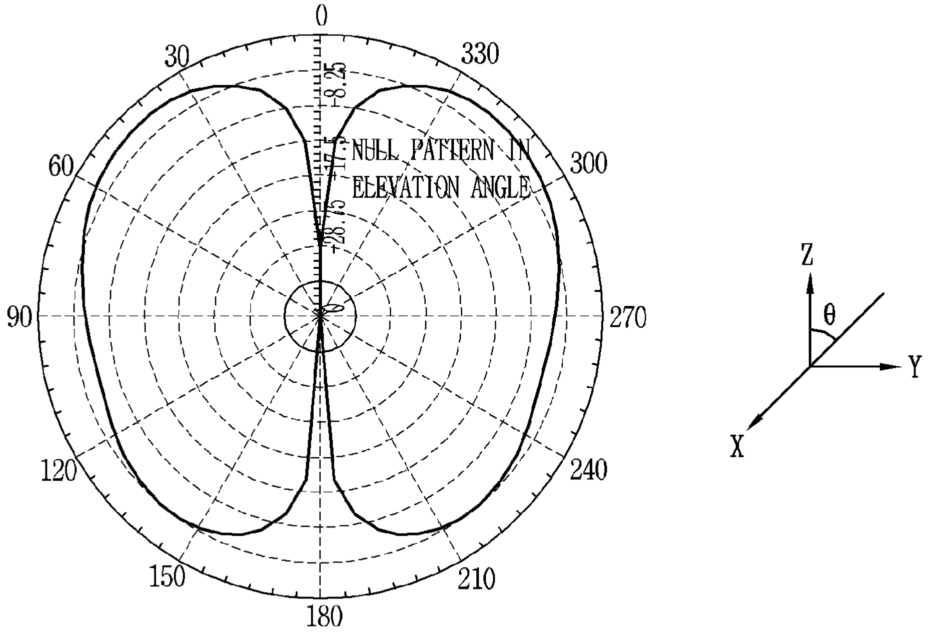
FIG. 11A shows a radiation pattern for a symmetrical structure such as a cone antenna provided with two shorting pins. On the other hand.

On the other hand, the electronic device having the cone antenna according to the present disclosure has excellent reception performance in almost all directions through the cone antenna. Specifically, a radiation pattern of the cone antenna has excellent reception performance even from boresight in the elevation angle direction. In this regard, FIG. 11A shows a radiation pattern for a symmetrical structure such as a cone antenna provided with two shorting pins. On the other hand, FIG. 11B shows a radiation pattern for a structure such as a cone antenna provided with a single shorting pin.

Referring to FIG. 11A, a cone antenna having two shorting pins has a problem in that a null of the radiation pattern is generated from boresight in an elevation angle direction, thereby deteriorating reception performance. In order to solve this problem, in the present disclosure, the null of the radiation pattern may be removed from boresight in the elevation angle direction through a structure in which the cone antenna 1110 is connected to a single shorting pin 1102. In this regard, referring to FIG. 4A, the cone antenna with a single shorting pin forms a current path of the power feeder 1105—the cone radiator 1100R—the metal patch 1101—the shorting pin 1102—the ground layer GND. In this way, through an asymmetric current path of the power feeder 1105—the cone radiator 1100R—the metal patch 1101—the shorting pin 1102—the ground layer GND, a null of the radiation pattern may be prevented from being generated from boresight in the elevation angle direction.

Figure 11B:
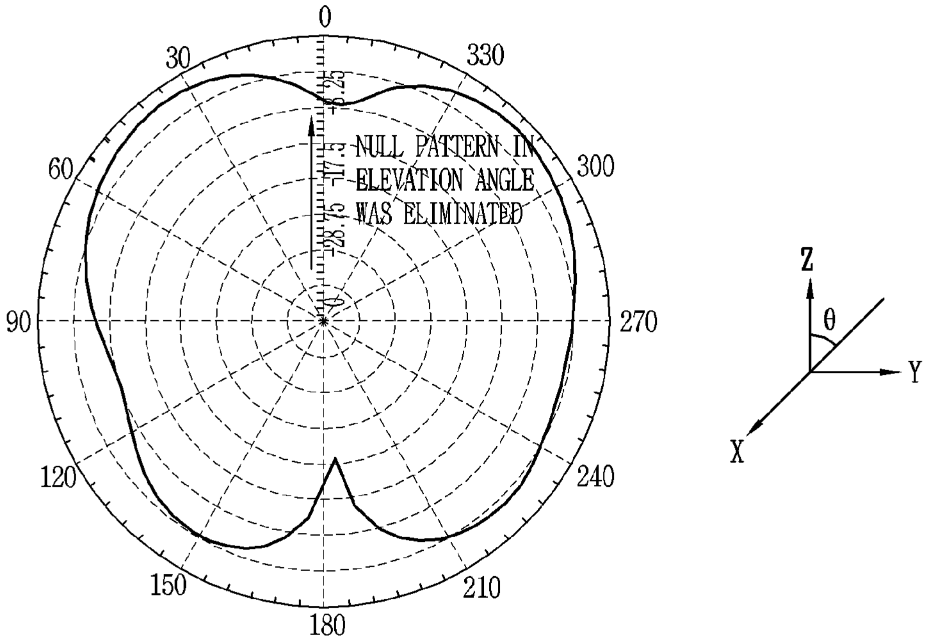
FIG. 11B shows a radiation pattern for a structure such as a cone antenna provided with a single shorting pin.

Referring to FIG. 11B, in the cone antenna having a single shorting pin, the null of the radiation pattern may be removed from boresight in the elevation angle direction. Accordingly, the present disclosure has an advantage in that reception performance can be improved in almost all directions.

In the above, an electronic device employing an antenna structure having two or more cone radiators inside the metal patch 1101 according to an aspect of the present disclosure has been described. Hereinafter, a vehicle employing an antenna structure having two or more cone radiators inside the metal patch 1101 according to another aspect of the present disclosure will be described. In this regard, the foregoing description of the hybrid cone antenna 1100 having a plurality of metal patches may also be applied to a vehicle having a hybrid cone antenna having a plurality of metal patches.

Figure 12A:
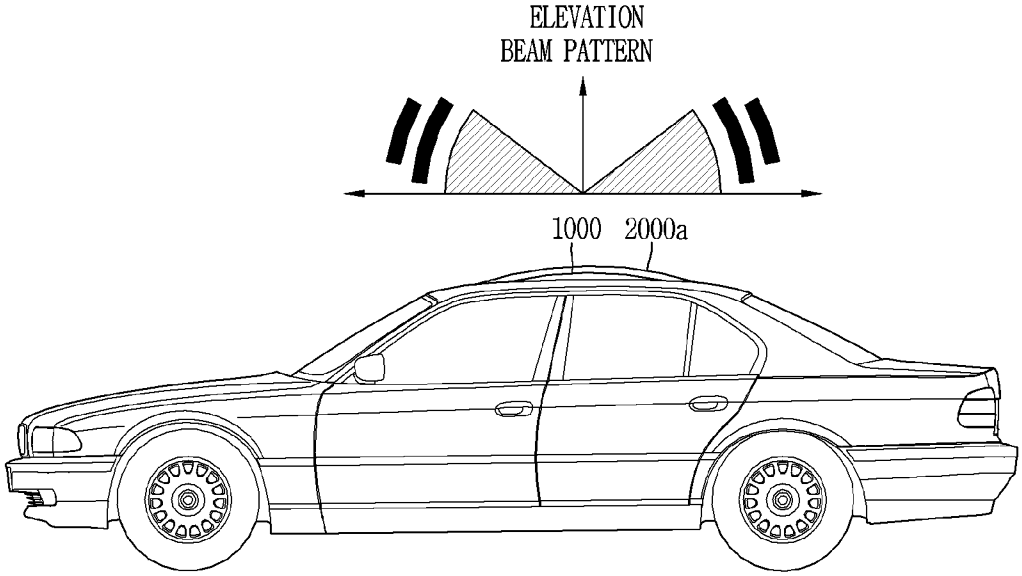
FIGS. 12A and 12B show a structure in which an antenna system can be mounted in a vehicle including the antenna system mounted on the vehicle according to the present disclosure.
Figure 12B:
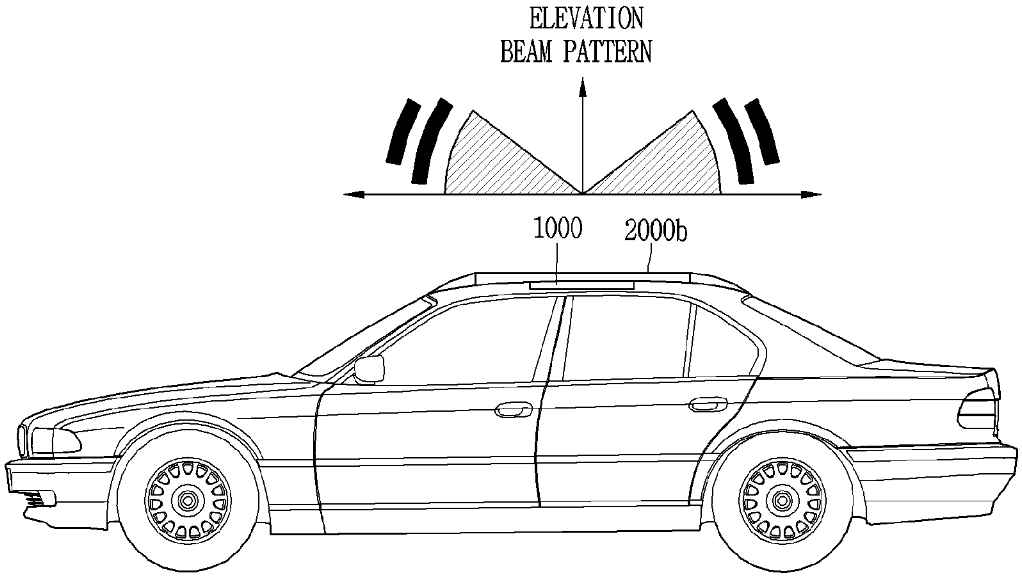

FIGS. 12A and 12B show a structure in which an antenna system can be mounted in a vehicle including the antenna system mounted on the vehicle according to the present disclosure. In this regard, FIG. 12A illustrates a configuration in which an antenna system 1000 is mounted inside a roof of a vehicle. In this regard, a case in which the antenna system 1000 is mounted on the roof of the vehicle may also be included therein. Meanwhile, the antenna system 1000 may be mounted inside the roof of the vehicle and a roof frame of a rear mirror.

Referring to FIGS. 12A and 12B, in the present disclosure, in order to improve an appearance of an automobile (vehicle) and preserve telematics performance in case of a collision, a shark fin antenna in the related art will be replaced with a non-protruding flat antenna. In addition, the present disclosure intends to propose an antenna in which an LTE antenna and a 5G antenna are integrated in consideration of 5G communication along with the provision of the mobile communication service (LTE) in the related art.

Referring to FIGS. 12A and 12B, the antenna system 1000 is configured as a structure, and disposed on a roof of a vehicle. A radome 2000*a* for protecting the antenna system 1000 from an external environment and an external impact while driving a vehicle may surround the antenna system 1000. The radome 2000*a* may be made of a dielectric material through which a radio wave signal transmitted and received between the antenna system 1000 and a base station can be transmitted.

Referring to FIG. 12A, the antenna system 1000 may be disposed inside a roof structure of a vehicle, and may be configured such that at least part of the roof structure is implemented with a non-metal. In this case, at least part of the roof structure 2000*a* of the vehicle may be implemented with a non-metal, and made of a dielectric material through which a radio signal transmitted and received between the antenna system 1000 and the base station can be transmitted.

Furthermore, referring to FIG. 12B, the antenna system 1000 may be disposed inside a roof frame of a vehicle, and at least part of the roof frame may be configured to be implemented with a non-metal. In this case, at least part of the roof frame 2000*b* of the vehicle may be made of a non-metal, and may be made of a dielectric material through which a radio signal transmitted and received between the antenna system 1000 and the base station may be transmitted.

Figure 13:
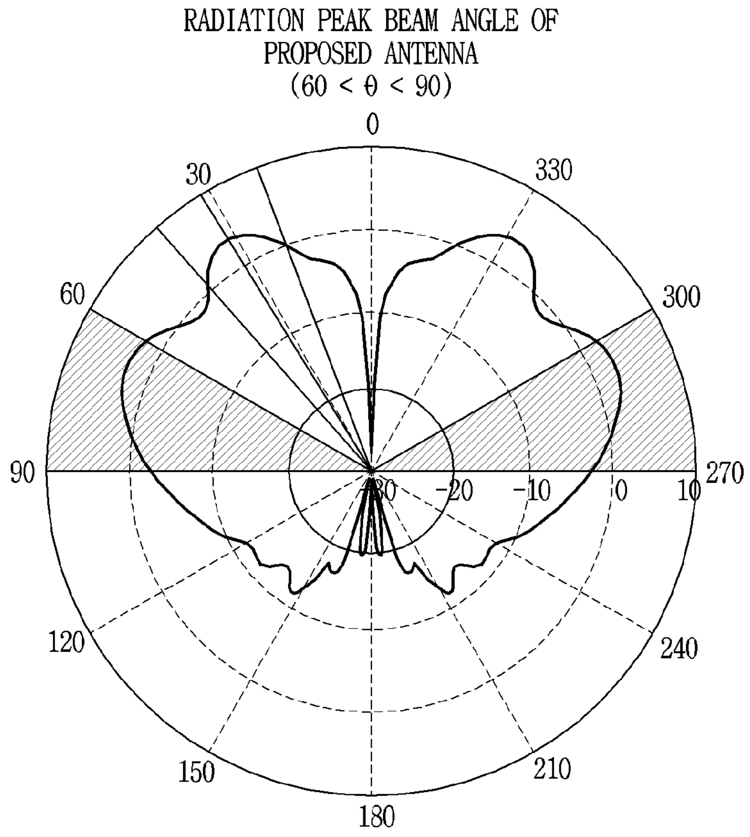
FIG. 13 shows an example of a radiation pattern of a vehicle having a hybrid cone antenna in which a plurality of shorting pins according to the present disclosure have a plurality of metal patches in a symmetrical form.

Meanwhile, referring to FIGS. 12A and 12B, it may not be important for the vehicle to transmit or receive a signal through boresight in the elevation angle direction. In this regard, the vehicle needs to transmit and/or receive a signal only in a predetermined angular section, for instance, at 30 degrees, in a horizontal direction other than in a vertical direction in the elevation angle direction. In this regard, FIG. 13 shows an example of a radiation pattern of a vehicle having a hybrid cone antenna in which a plurality of shorting pins according to the present disclosure have a plurality of metal patches in a symmetrical form. Referring to FIGS. 12A, 12B and 13, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

In this regard, a hybrid cone antenna having a plurality of metal patches according to the present disclosure may be configured with a plurality of shorting pins, thereby implementing symmetry of electrical properties in various directions along with structural stability. In this regard, when a plurality of shorting pins are disposed at predetermined angular intervals, the current distribution of the hybrid cone antenna having the plurality of metal patches is symmetrically formed. Accordingly, there is an advantage in that mobility, in particular, symmetry of electrical characteristics in various directions can be maintained even when changing directions in an electronic device or vehicle provided with a hybrid cone antenna having a plurality of metal patches. In this regard, when the plurality of shorting pins are symmetrically disposed, a null of the radiation pattern may be generated from boresight in the elevation angle direction. Therefore, in the case of a vehicle, it may not be important to transmit or receive a signal through boresight in the elevation angle direction. In this regard, referring to FIGS. 12A, 12B and 13, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

Figure 14A:
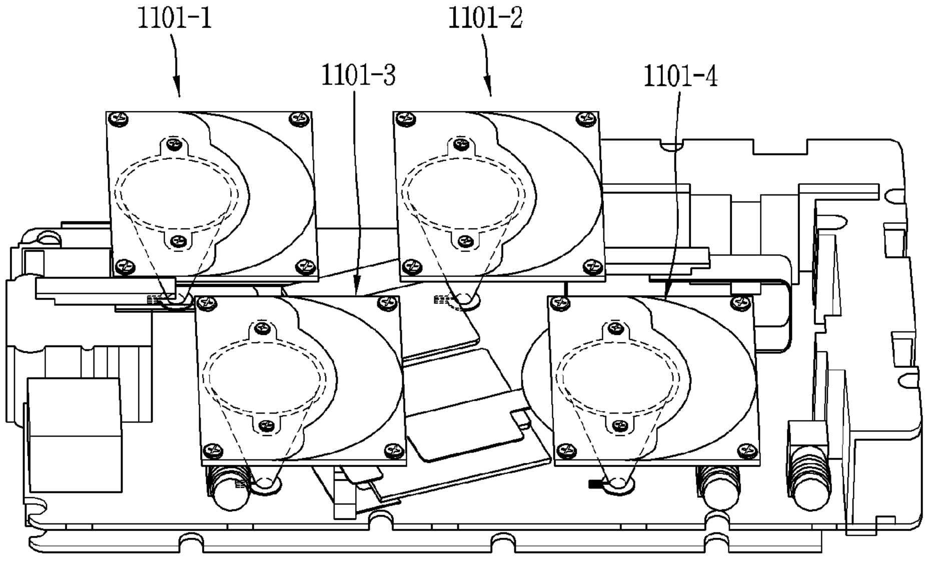
FIG. 14A shows a shape of an electronic device or vehicle having a plurality of cone antennas according to the present disclosure. Furthermore.
Figure 14B:
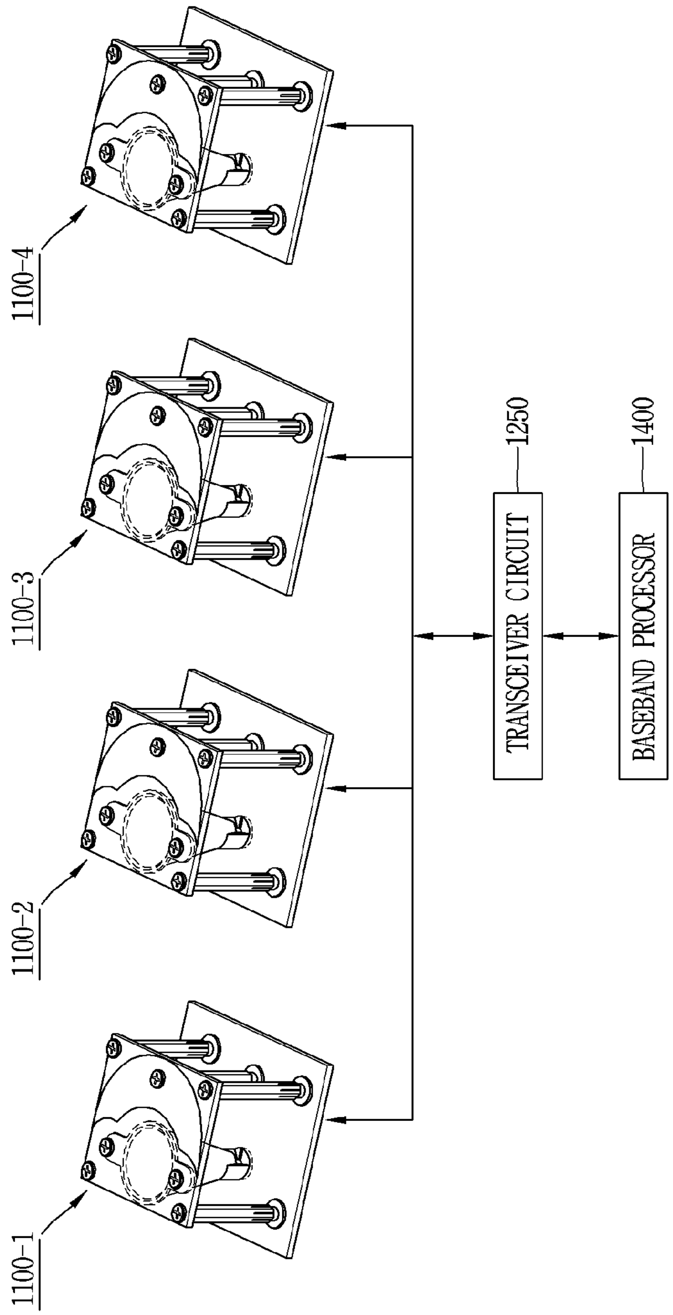
FIG. 14B shows a structure of an electronic device or vehicle having a plurality of cone antennas, a transceiver circuit, and a processor according to the present disclosure.

An electronic device or vehicle with the cone antenna 1100 having the cone supporter 1105*a* such as a dielectric may be implemented with an antenna system including a plurality of cone antennas. In this regard, FIG. 14A shows a shape of an electronic device or vehicle having a plurality of cone antennas according to the present disclosure. Furthermore, FIG. 14B shows a structure of an electronic device or vehicle having a plurality of cone antennas, a transceiver circuit, and a processor according to the present disclosure.

Referring to FIG. 14A, the electronic device or vehicle may include four cone antennas, that is, a first cone antenna 1100-1 to a fourth cone antenna 1100-4. Here, the number of cone antennas can be changed to various numbers according to applications. Here, the first cone antenna 1100-1 to the fourth cone antenna 1100-4 may be implemented in the same shape for the same antenna performance. In addition, the first cone antenna 1100-1 to the fourth cone antenna 1100-4 may be implemented in different shapes for optimal antenna performance and an optimal arrangement structure.

Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. Furthermore, the vehicle may be configured to communicate with a 4G base station or a 5G base station, or may be configured to communicate with an adjacent vehicle directly or via a peripheral device.

On the other hand, with reference to FIGS. 4A to 14B, a vehicle provided with the cone antenna 1100 having the cone supporter 1105*a* such as a dielectric according to the present disclosure will be described as follows. In this regard, the foregoing description of the cone antenna having a cone supporter such as a dielectric is also applicable to a vehicle provided with a cone antenna having a cone supporter such as a dielectric. In this regard, a vehicle 300 is provided with the antenna system 1000 configured with a cone antenna. Here, the antenna system 1000 may include an antenna in which a plurality of cone antennas are arranged instead of the cone antenna. Furthermore, the antenna system 1000 may include an antenna in which a plurality of cone antennas are arranged, a transceiver circuit connected thereto, and a baseband processor.

The vehicle 300 provided with a cone antenna having a cone supporter such as a dielectric may be provided with the antenna system including the cone radiator 1100R, the metal patch 1101, the shorting pin 1102, the power feeder 1105, and the dielectric 1105*a*. Meanwhile, the antenna system 1000 provided in the vehicle 300 may further include the transceiver circuit 1250.

In this regard, the cone radiator 1100R is disposed to connect the first substrate S1 and the second substrate S2 spaced apart from the first substrate S1 by a predetermined gap. In this regard, the cone radiator 1100R may include an upper aperture coupled to the first substrate S1 and a lower aperture coupled to the second substrate S2.

Meanwhile, the metal patch 1101 is disposed on a front or rear surface of the first substrate S1, and disposed to be spaced apart from the upper aperture. The shorting pin 1120 is disposed to electrically connect the metal patch 1101 and the ground layer GND of the second substrate. In addition, the power feeder 1105 is disposed on the second substrate S2, and configured to transmit a signal to the cone radiator 1100R through the lower aperture.

On the other hand, the dielectric according to the present disclosure, that is, the cone supporter 1105*a*, may have a cylindrical shape to surround the lower aperture of the cone radiator 1100R. More specifically, an end portion of the power feeder 1105 may be defined in a ring shape to correspond to a shape of the lower aperture of the radiator 1100R. Meanwhile, the dielectric, that is, the cone supporter 1105*a*, may be defined in a three-dimensional sector form from which the dielectric is partially removed in a predetermined angular range in a region where a transmission line of the power feeder 1105 is disposed.

On the other hand, the antenna system 1000 disposed in the vehicle includes a plurality of cone antennas, for example, the first cone antenna 1100-1 to the fourth cone antenna 1100-4. Specifically, the antenna system 1100 may be implemented with a plurality of cone antennas, that is, the first to fourth cone antennas 1100-1 to 1100-4, disposed on an upper left portion, an upper right portion, a lower left portion, and a lower right portion of the antenna system 1100 in the vehicle. In this regard, the plurality of cone antennas 1100-1 to 1100-4 may include the metal patches 1101-1, 1101-2, the cone radiators 1100R, and the power feeders 1105.

Furthermore, the antenna system 1000 disposed in the vehicle may further include the transceiver circuit 1250. In addition, the antenna system 1000 disposed in the vehicle may further include a processor 1400. Here, the processor 1400 may be a baseband processor configured to control the transceiver circuit 1250.

In this regard, the transceiver circuit 1250 is connected to the cone radiators 1100R through the power feeders 1105, respectively. Furthermore, the transceiver circuit 1250 may control a first signal in a first frequency band to be radiated through the cone antenna 1110. In addition, the transceiver circuit 1250 may control a second signal in a second frequency band lower than the first frequency band to be radiated through the cone antenna 1110.

In this regard, the processor 1400 may control the transceiver circuit 1250 to perform multi-input multi-output (MIMO) through two or more of the plurality of cone antennas 1100-1 to 1100-4.

When a resource of the first frequency band is allocated to the vehicle, the processor 1400 controls the transceiver circuit to perform multi-input multi-output (MIMO) through two or more of the plurality of cone antennas 1100-1 to 1100-4. To this end, when the resource of the first frequency band is allocated to the vehicle, the processor 1400 may control the transceiver circuit 1250 to operate in the first frequency band. In this regard, the processor 1400 may inactivate a partial configuration of the transceiver circuit 1250 operating in the second frequency band.

On the contrary, when a resource of the first frequency band is allocated to the vehicle, the processor 1400 controls the transceiver circuit to perform multi-input multi-output (MIMO) through two or more of the plurality of cone antennas 1100-2 to 1100-4. To this end, when the resource of the second frequency band is allocated to the vehicle, the processor 1400 may control the transceiver circuit 1250 to operate in the second frequency band. In this regard, the processor 1400 may inactivate some components of the transceiver circuit 1250 operating in the second frequency band.

On the other hand, when both the resource of the first frequency band and the resource of the second frequency band are allocated to the vehicle, the processor 1400 may use only one cone antenna. To this end, the processor 1400 may control the transceiver circuit 1250 to perform carrier aggregation (CA) on the first signal and the second signal received through one cone antenna. Accordingly, the processor 1400 may simultaneously acquire both the first and second information included in the first and second signals, respectively.

Meanwhile, each of the antennas 1100-1 to 1100-4 of the antenna system 1000 disposed in the vehicle may further include a shorting pin 1102 disposed to electrically connect the second metal patch 1101-2 and the ground layer GND of the second substrate S2. In this case, the shorting pin 1102 may be provided with a single shorting pin between the second metal patch 1101-2 and the second substrate S2. As described above, a null of a radiation pattern may be prevented from being generated in the elevation angle direction of the cone antenna by a single shorting pin.

Alternatively, the shorting pin 1102 may be provided with a plurality of shorting pins between the metal patch 1101 and the second substrate S2. As described above, a null of the radiation pattern may be generated in the elevation angle direction of the cone antenna by the plurality of shorting pins, but this is not a problem in the case of a vehicle.

On the other hand, an end portion of the power feeder 1105 may be defined in a ring shape to correspond to a shape of the lower aperture. In this case, the cone antenna may further include a fastener 1107 configured to be connected to the second substrate S2 through an inside of an end portion of the power feeder 1105. As such, the second substrate S2 on which the power feeder is disposed and the cone radiator 1100R may be fixed through the fastener 1107.

On the other hand, as described above, the dielectric according to the present disclosure, that is, the cone supporter 1105*a*, is defined in a cylindrical shape to surround the lower aperture of the cone radiator 1100R. In this case, the dielectric, that is, the cone supporter 1105*a*, may be defined in a three-dimensional sector form from which the dielectric is partially removed in a predetermined angular range in a region where a transmission line of the power feeder 1105 is disposed. Furthermore, the three-dimensional sector-shaped dielectric 1105*a* may be disposed above an end portion of the ring-shaped power feeder 1105 to reduce a ring diameter of the end portion of the power feeder 1105. On the contrary, as the three-dimensional sector-shaped dielectric 1105*a* is disposed above an end portion of the ring-shaped power feeder 1105, a diameter of the lower aperture of the cone radiator 1100R increases. Accordingly, there is an advantage in that a ground region can be secured by the dielectric according to the present disclosure, that is, the cone supporter 1105*a*, and the mechanical stability of the cone radiator 1100R can be improved.

Meanwhile, the metal patch 1100 may be disposed at only one side to surround a partial region of the upper opening of the cone radiator 1100R, thereby minimizing a size of the cone antenna including the metal patch 1100.

On the other hand, an arrangement structure of a plurality of cone antennas and a signal transceiving method through the arrangement structure are as follows. In this regard, the cone antennas 1100-1 to 1100-4 may be disposed on an upper left, an upper right, a lower left, and a lower right of the electronic device. The arrangement form of the cone antennas 1100-1 to 1100-4 is preferably configured to maximize a separation distance between the cone antennas in the electronic device. Accordingly, mutual interference between the cone antennas 1100-1 to 1100-4 is minimized, which is advantageous in a multi-input multi-output (MIMO) or diversity operation.

In the above, an electronic device or vehicle having a cone antenna according to the present disclosure has been described. The technical effects of an electronic device or vehicle having such a cone antenna will be described as follows.

According to the present disclosure, there is an advantage capable of providing a cone antenna having a plurality of metal patches operating in a wide frequency band from a low frequency band to a 5G sub-6 band.

Furthermore, according to the present disclosure, a cone radiator operating from a low frequency band to a 5G sub-6 band is optimally disposed with a plurality of metal patches and shorting pins in an electronic device or vehicle, thereby having an advantage capable of optimizing antenna performance.

In addition, according to the present disclosure, there is an advantage capable of providing a cone antenna having improved bandwidth characteristics through multi-resonance in a low frequency band through a multi-wing structure integrally formed with a radiator.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a plurality of cone antennas and a configuration for controlling those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. An electronic device having an antenna, the electronic device comprising:

a cone antenna comprising:

a first substrate;

a second substrate spaced apart from the first substrate by a predetermined gap and provided with a ground layer;

a cone radiator provided between the first substrate and the second substrate, an upper part of which is connected to the first substrate, a lower part of which is connected to the second substrate, and provided with an aperture at the upper part;

a metal patch disposed on the first substrate, and spaced apart from the upper aperture;

a shorting pin disposed to electrically connect the metal patch and the ground layer of the second substrate;

a power feeder disposed on the second substrate, and configured to transmit a signal through a lower aperture; and a dielectric configured in a cylindrical shape to surround the lower aperture; and a transceiver circuit connected to the cone radiator through the power feeder to control a signal to be radiated through the cone antenna, wherein an end portion of the power feeder is defined in a ring shape to correspond to a shape of the lower aperture, and wherein the end portion of the power feeder and a lower region of a transmission line region connected to the end portion are filled without removing the ground layer of the second substrate.

2. The electronic device of claim 1, wherein the dielectric is defined in a three-dimensional sector form from which the dielectric is partially removed in a predetermined angular range in a region where a transmission line of the power feeder is disposed.

3. The electronic device of claim 2, wherein the dielectric in the three-dimensional sector shape is disposed above the end portion of the power feeder in the ring shape to reduce a ring diameter of the end portion of the power feeder and a diameter of the lower aperture.

4. The electronic device of claim 1, wherein the shorting pin is defined as a single shorting pin vertically connected between the metal patch and the second substrate, and a null of a radiation pattern of the cone antenna is prevented from being generated by the single shorting pin.

5. The electronic device of claim 4, wherein the shorting pin is provided with a screw having a predetermined diameter configured to vertically connect between the metal patch and the second substrate, and the shorting pin further comprises a second dielectric disposed to surround the screw corresponding to the shorting pin, and configured in a cylindrical shape having a predetermined diameter.

6. The electronic device of claim 1, further comprising:

at least one non-metal supporter configured to vertically connect the first substrate and the second substrate so as to support the first substrate and the second substrate.

7. The electronic device of claim 1, further comprising:

a third substrate disposed below the second substrate, wherein the transceiver circuit is disposed on a bottom surface of the third substrate.

8. The electronic device of claim 7, wherein a signal line is disposed on a rear surface of the third substrate corresponding to the filled ground layer of the second substrate, and signal loss is reduced by the filled ground layer corresponding to the signal line.

9. The electronic device of claim 1, wherein the cone antenna further comprises:

a plurality of outer rims configured to constitute the upper aperture of the cone antenna and to connect the cone antenna to the first substrate; and a plurality of fasteners configured to connect the outer rims and the first substrate.

10. The electronic device of claim 1, further comprising:

a fastener configured to be connected to the second substrate through an inside of the end portion of the power feeder, wherein the second substrate on which the power feeder is disposed and the cone radiator are fixed through the fastener.

11. The electronic device of claim 1, wherein the metal patch is disposed only on one side so as to surround a partial region of an upper opening of the cone antenna to minimize a size of the cone antenna including the metal patch.

12. The electronic device of claim 1, wherein the metal patch is disposed as a rectangular patch having an outer side shape in a rectangular form, and an inner side shape of the rectangular patch is defined in a circular shape to correspond to a shape of an outer line of the upper aperture so as to allow a signal radiated from the cone antenna to be coupled through an inner side of the rectangular patch.

13. The electronic device of claim 1, wherein the metal patch is disposed as a circular patch having an outer side shape in a circular form, and an inner side shape of the circular patch is defined in a circular shape to correspond to an outer shape of the upper aperture so as to allow a signal radiated from the cone antenna to be coupled through an inner side of the circular patch.

14. A vehicle having an antenna, the vehicle comprising:

a cone antenna comprising:

a cone radiator provided between a first substrate and a second substrate, an upper part of which is connected to the first substrate, a lower part of which is connected to the second substrate, and provided with an aperture at the upper part;

a metal patch disposed on the first substrate, and spaced apart from the upper aperture;

a shorting pin disposed to electrically connect the metal patch and the ground layer of the second substrate;

a power feeder disposed on the second substrate, and configured to transmit a signal through a lower aperture; and a dielectric configured in a cylindrical shape to surround the lower aperture, wherein an end portion of the power feeder is defined in a ring shape to correspond to a shape of the lower aperture, and wherein the end portion of the power feeder and a lower region of a transmission line region connected to the end portion are filled without removing the ground layer of the second substrate.

15. The vehicle of claim 14, wherein the cone antenna is implemented with a plurality of cone antennas, and the cone antenna further comprises:

a transceiver circuit connected to the cone radiator through the power feeder to control a signal to be radiated through the cone antenna; and a processor that controls an operation of the transceiver circuit, and wherein the processor controls the transceiver to perform multi-input multi-output (MIMO) through the plurality of cone antennas.

16. The vehicle of claim 14, wherein the dielectric is defined in a three-dimensional sector form from which the dielectric is partially removed in a predetermined angular range in a region where a transmission line of the power feeder is disposed.

17. The vehicle of claim 16, wherein the dielectric in the three-dimensional sector shape is disposed above the end portion of the power feeder in the ring shape to reduce a ring diameter of the end portion of the power feeder and a diameter of the lower aperture.

* * * * *